United States Patent
Héritier

(10) Patent No.: US 11,176,407 B1
(45) Date of Patent: Nov. 16, 2021

(54) OBJECT DETECTION IN AN IMAGE BASED ON ONE OR MORE ORIENTED PROJECTION SPACES

(71) Applicant: MATROX ELECTRONIC SYSTEMS LTD., Dorval (CA)

(72) Inventor: Maguelonne Héritier, Pierrefonds (CA)

(73) Assignee: Matrox Electronics Systems Ltd., Dorval (CA)

( * ) Notice: Subject to any disclaimer, the term of this patent is extended or adjusted under 35 U.S.C. 154(b) by 0 days.

(21) Appl. No.: 16/783,127

(22) Filed: Feb. 5, 2020

Related U.S. Application Data

(60) Provisional application No. 62/801,641, filed on Feb. 5, 2019.

(51) Int. Cl.
*G06K 9/46* (2006.01)
*G06K 9/20* (2006.01)

(52) U.S. Cl.
CPC ......... *G06K 9/4638* (2013.01); *G06K 9/2054* (2013.01)

(58) Field of Classification Search
None
See application file for complete search history.

(56) References Cited

U.S. PATENT DOCUMENTS

| | | | |
|---|---|---|---|
| 3,069,654 A | 12/1962 | Hough | |
| 6,853,751 B1 | 2/2005 | Milligan, Jr. et al. | |
| 7,027,651 B2 | 4/2006 | Simon et al. | |
| 7,574,045 B2 | 8/2009 | Simon et al. | |
| 2013/0335575 A1* | 12/2013 | Tsin | G06T 7/251 348/169 |
| 2015/0261803 A1* | 9/2015 | Song | G06K 9/4671 707/797 |

OTHER PUBLICATIONS

Zhengke Qin, Peng Wang, Jia Sun and Hong Qiao, "Polygon detection and Localization based on link-line model," Proceeding of the 11th World Congress on Intelligent Control and Automation, Shenyang, China, 2014, pp. 1874-1880, doi: 10.1109/WCICA.2014.7053006. (Year: 2014).*

Ballard, D. H., "Generalizing the Hough Transform to Detect Arbitrary Shapes", Pattern Recognition, vol. 13, No. 2, 1981, pp. 111-122.

(Continued)

*Primary Examiner* — Fayyaz Alam
(74) *Attorney, Agent, or Firm* — Build IP, LLC; Robert V. Donahoe

(57) ABSTRACT

A method and an image processing system for detecting an object in an image are described. A set of line segments are detected in the image. A subset of the line segments is identified based on a projection space orientation that defines a projection space. Each one of the line segments of the subset of line segments is projected into the projection space to obtain a set of projected line segments, where each projected line segment of the set of projected line segments is represented by a respective set of projection parameters. A determination is performed, in the projection space, based on the sets of projection parameters and a shape criterion that characterizes the object, of whether the image includes an instance of the object. In response to determining that the image includes the instance of the object, the instance of the object is output.

25 Claims, 31 Drawing Sheets

(56) References Cited

OTHER PUBLICATIONS

Bhaskar, et al., "Combined Spatial and Transform Domain Analysis for Rectangle Detection", IEEE, 2010 13th International Conference on Information Fusion, 2010, 7 pages.
Guerzhoy, et al., "Segmentation of Rectangular Objects Lying on an Unknown Background in a Small Preview Scan Image", 2008 Canadian Conference on Computer and Robot Vision, 2008, 7 pages.
Herley, Cormac, "Efficient Inscribing of Noisy Rectangular Objects in Scanned Images", IEEE, 2004 International Conference on Image Processing, vol. 4, 2004, 4 pages.
Herley, Cormac, "Recursive Method to Extract Rectangular Objects from Scans", IEEE, Proceedings 2003 International Conference on Image Processing, vol. 3, 2003, 4 pages.
Juneja, et al., "A New Approach for Feature Extraction of an Image", 3rd International Conference on Intelligent Computational Systems (ICICS'2013), Jan. 26-27, 2013, pp. 21-28.
Li, et al., "Automatic Comic Page Segmentation based on Polygon Detection", Multimedia Tools and Applications, vol. 69, No. 1, 2014, pp. 171-197.
Liu, et al., "Geometric Property based Ellipse Detection Method", Journal of Visual Communication and Image Representation, vol. 24, No. 7, 2013, pp. 1075-1086.
Nienhuser, et al., "Fast and Reliable Recognition of Supplementary Traffic Signs", 2010 IEEE Intelligent Vehicles Symposium, Jun. 21-24, 2010, pp. 896-901.
Patel, et al., "2D Basic Shape Detection Using Region Properties", International Journal of Engineering Research & Technology (IJERT), vol. 2, No. 5, May 2013, pp. 1147-1153.
Shaw, et al., "Perspective Rectangle Detection", Proceedings of the Workshop of the Application of Computer Vision, in conjunction with ECCV 2006, 2006, 9 pages.
Toss, Tomas, "Automatic Identification and Cropping of Rectangular Objects in Digital Images", Uppsala Universitet, Department of Information Technology, Sep. 2012, 77 pages.
Yu, et al., "Detecting Circular and Rectangular Particles based on Geometric Feature Detection in Electron Micrographs", Journal of Structural Biology, vol. 145, 2004, pp. 168-180.
Zhu, et al., "Automatic Particle Detection Through Efficient Hough Transforms", IEEE Transactions on Medical Imaging, vol. 22, No. 9, Sep. 2003, pp. 1053-1062.
Jung, et al., "Rectangle Detection based on a Windowed Hough Transform", IEEE, Proceedings of the 17th Brazilian Symposium on Computer Graphics and Image Processing (SIBGRAPI'04), 2004, pp. 113-120.
Liu, et al., "PLDD: Point-lines distance distribution for detection of arbitrary triangles, regular polygons and circles", J. Vis. Commun. Image R., vol. 25, No. 2, 2014, pp. 273-284.

\* cited by examiner

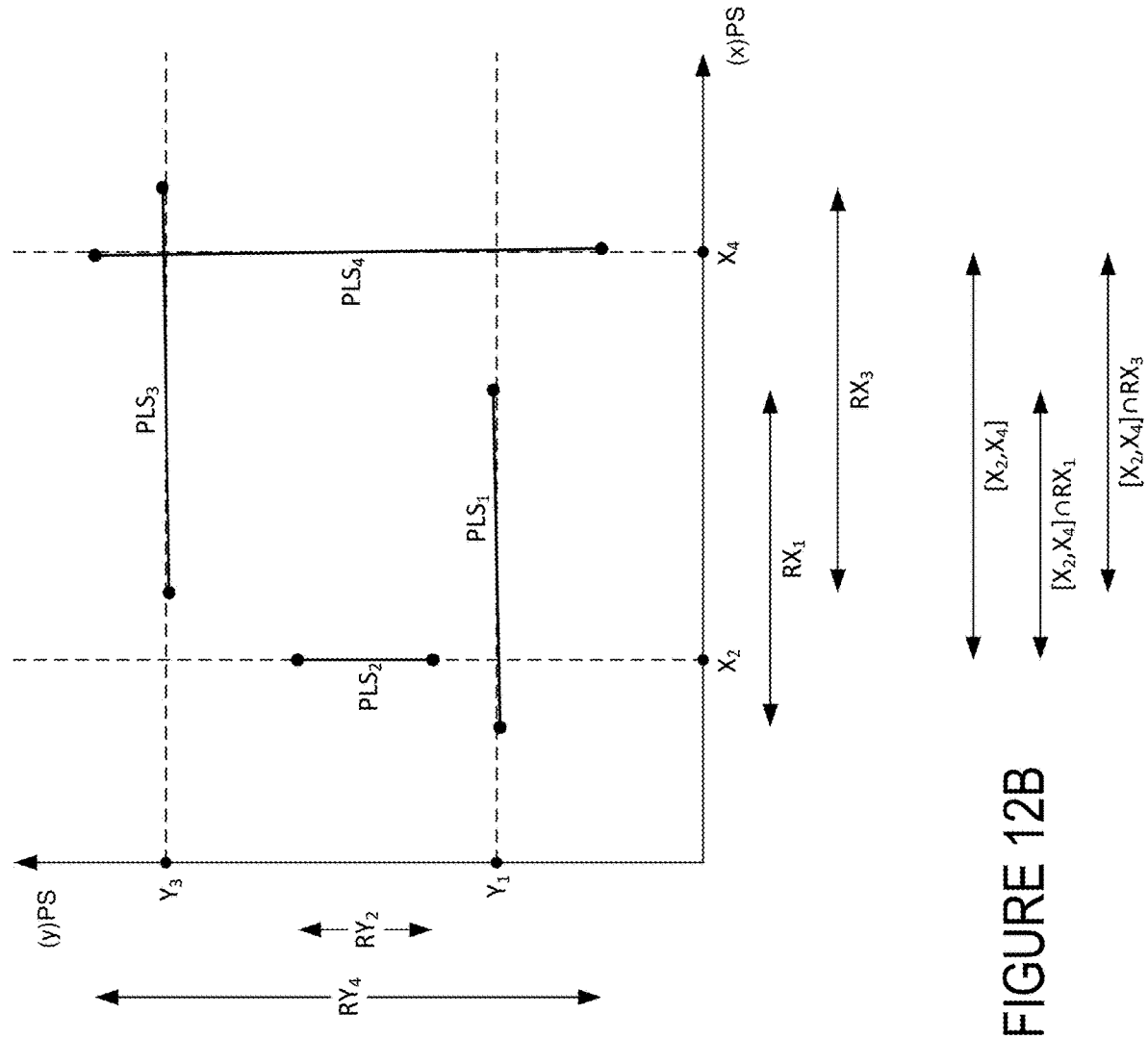
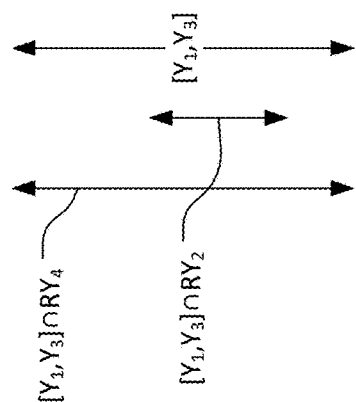
FIGURE 12B

OBJECT DETECTION IN AN IMAGE BASED ON ONE OR MORE ORIENTED PROJECTION SPACES

CROSS-REFERENCE TO RELATED APPLICATIONS

This application claims the benefit of U.S. Provisional Application No. 62/801,641, filed on Feb. 5, 2019, which is hereby incorporated by reference.

FIELD

Embodiments of the invention relate to the field of image processing, and more specifically, to the detection of an object in an image.

BACKGROUND

In computer vision, machine vision and image processing, object recognition is the task of detecting the presence and/or location of objects in images or video sequences. Object recognition is employed in a wide variety of fields to detect and/or locate real world objects that appear in images recorded by cameras or other image acquisition devices. For example, object recognition is used in manufacturing, robotics, medical imaging, security and transportation.

BRIEF DESCRIPTION OF THE DRAWINGS

The invention may best be understood by referring to the following description and accompanying drawings that are used to illustrate embodiments of the invention. In the drawings:

FIG. 12B illustrates exemplary detailed operations for determining whether the subset of projected line segments of FIG. 12A satisfies a predefined shape criterion, in accordance with some embodiments.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 1:
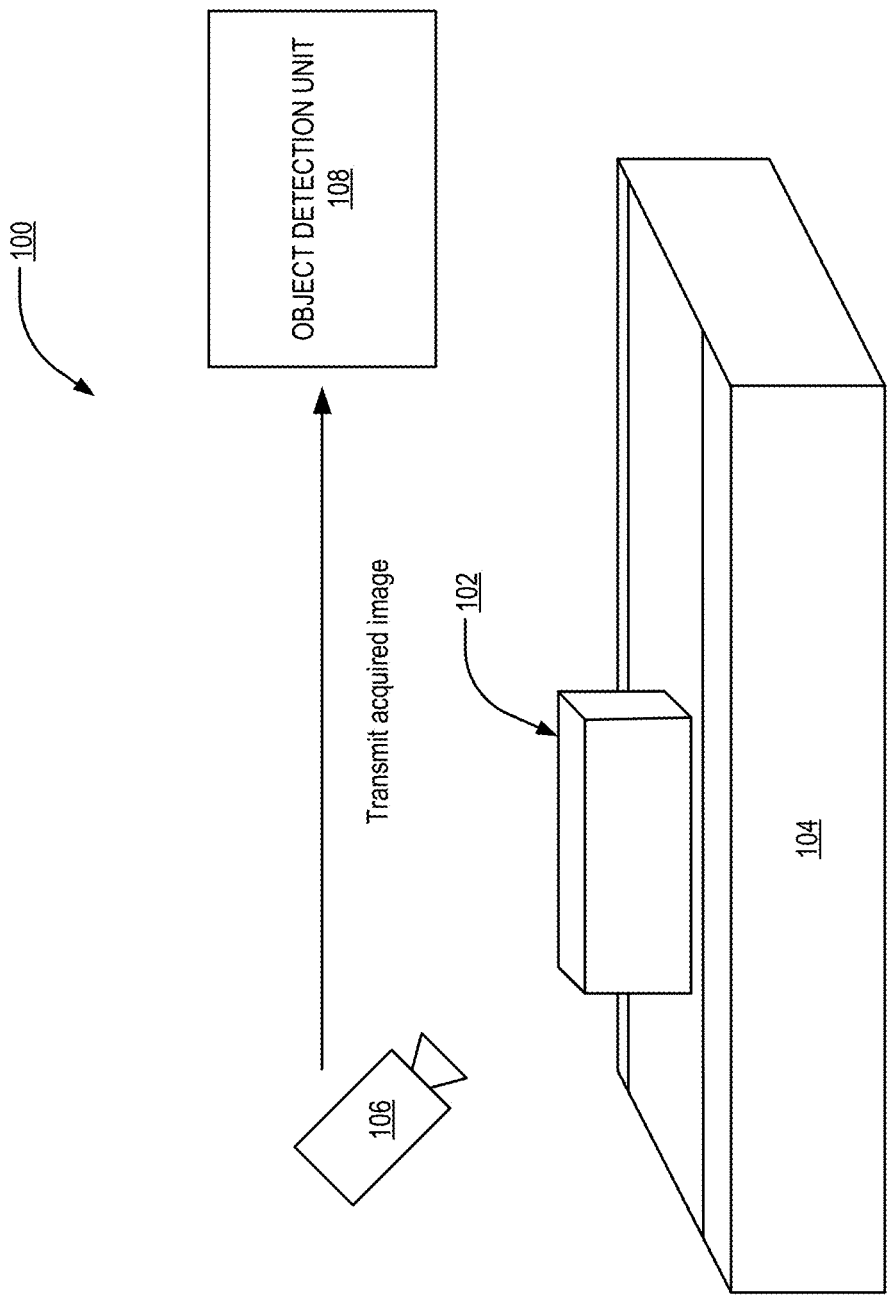
FIG. 1 is a block diagram of an exemplary system for detecting an object in an image, in accordance with some embodiments.

FIG. 1 is a block diagram of an exemplary system 100 for detecting an object in an image, in accordance with some embodiments. The system 100 includes an image acquisition device 106 (such as a digital still camera or video camera) that is operative to acquire an image of a scene including an object 102 to be detected. The scene can, for example, be part of an inspection station 104 of a production line, in order to detect and locate objects passing through the inspection station. The acquired image is transmitted to the object detection unit 108 to be analyzed. The object detection unit 108 is operative to detect and/or locate one or more objects in the acquired image. The object detection unit 108 is implemented on an electronic device according to various embodiments as will be described in further details with reference to FIG. 21. While FIG. 1 illustrates a scene of a product inspection station in a manufacturing environment, the embodiments of the present invention are not limited to these types of applications. For example, the invention can be used to detect and locate objects in images from natural scenes (for example, in traffic or surveillance applications) or any other application where it is required to detect objects in images.

In the following description, an image may be a digital binary, grayscale or color image. The image may be an image acquired by a still camera or a video frame acquired by a video camera. The image may be acquired directly from the camera or retrieved from memory. The image may be an original image (e.g., as acquired by the image acquisition device) or may result from performing one or more preprocessing steps on an original image (e.g., downsampling, resizing, filtering, etc.). The image may consist of a region of interest (ROI) of a larger image, for example. An image coordinate system may be defined with respect to the image in order to locate elements in the image. For example, the image coordinate system may be an orthogonal coordinate system with first and second axes, here denoted $(x)_{IM}$ and $(y)_{IM}$, parallel to the axes of the image. The image coordinate system may have its origin in the center or in one of the corners of the image, for example.

Figure 2:
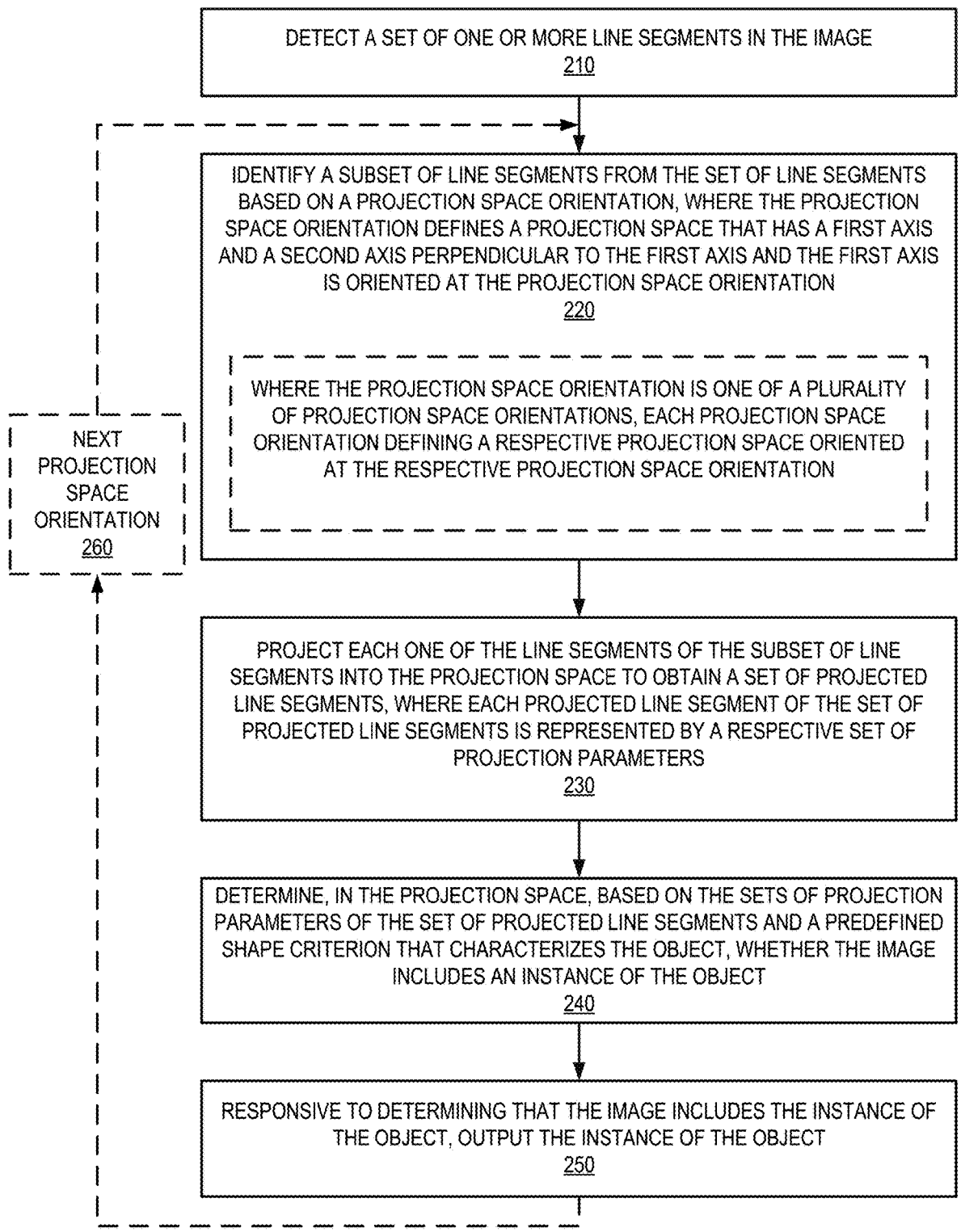
FIG. 2 illustrates a flow diagram of exemplary operations for detecting an object in an image, in accordance with some embodiments.

FIG. 2 illustrates a flow diagram of exemplary operations for detecting an object in an image, in accordance with some embodiments. The operations of FIG. 2 may be used to detect an object composed of (or including) one or more line segments generally oriented in a first direction. Examples of such objects include a line or larger line segment formed of multiple generally collinear line segments and a stripe pattern (or set of stripes) formed of multiple generally parallel line segments whose endpoints generally line up. Additionally or alternatively, the operations of FIG. 2 may be used to detect an object composed of (or including) one or more line segments generally oriented in a first direction and one or more line segments generally oriented in a second direction perpendicular to the first direction. Examples of such objects include a rectangle, a right-angled corner, and a grid pattern formed of multiple parallel and perpendicular line segments.

At operation 210, a set of one or more line segments is detected in the image. In some embodiments, the line segments can be detected by finding connected edge points in the image (e.g., using the Canny algorithm) and then approximating the connected edge points with one or more line segments (e.g., using the Rosin algorithm). As will be appreciated by one skilled in the art, various mechanisms can be used to detect the line segments in the image.

A detected line segment LS may be identified by a set of coordinates in the image coordinate system. For example, where the image coordinate system is an orthogonal coordinate system with axes $(x,y)_{IM}$ as described above, a detected line segment LS may be represented by a pair of segment endpoints (A, B), where each endpoint is represented by a pair of coordinates (X, Y)IM in the image coordinate system: A=(XA, YA) IM and B=(XB, YB) IM.

Each detected line segment, (LS)i, may be associated with a respective line segment orientation (θ)i. In some embodiments, the line segment orientation θ of a detected line segment refers to a general orientation of the line segment without consideration for any polarity of the line segment. For example, the line segment orientation θ may be calculated as an angle from the first axis (x)IM of the image coordinate system to the line segment and may be represented by an angle in the range [0, π] radians or [0, 180] degrees, for example. However, other representations for the orientation of a line segment may be used, as will be appreciated by one skilled in the art.

At operation 220, a subset of line segments from the set of line segments is identified based on a projection space orientation. The projection space orientation defines a projection space that has a first axis and a second axis perpendicular to the first axis and the first axis is oriented at the projection space orientation. In some embodiments, the projection space orientation may be predetermined, such as hardcoded or selected during a setup or configuration phase based on information input by a user, for example. In other embodiments, the projection space orientation may be determined for each input image, based on characteristics of the image. For example, the projection space orientation may be determined based on a distribution of the line segment orientations of the detected line segments, such as based on a histogram of the line segment orientations.

At operation 230, each one of the line segments of the subset of line segments identified at operation 220 is projected into the projection space to obtain a set of projected line segments. Each projected line segment of the set of projected line segments is represented by a respective set of projection parameters.

At operation 240, a determination is made, in the projection space, based on the sets of projection parameters of the set of projected line segments and a predefined shape criterion that characterizes the object, whether the image includes an instance of the object.

At operation 250, responsive to a determination, at operation 240, that the image includes an instance of the object, the instance of the object is output.

In some embodiments, as will be described further below, a plurality of projection space orientations may be defined. In these embodiments, each projection space orientation of the plurality of projection space orientations defines a respective projection space that has a respective first axis and a respective second axis (perpendicular to the respective first axis) and the respective first axis is oriented at the respective projection space orientation. In these embodiments, the operations 220, 230, 240, and 250 may be performed (e.g., repeated) for multiple projection space orientations among the plurality of projection space orientations (shown as operation 260). The plurality of projection space orientations may be predetermined (such as hardcoded or selected during a setup or configuration phase based on information input by a user, for example) or may be determined for each input image based on characteristics of the image (e.g., based on a distribution of the line segment orientations of the detected line segments).

Definition of Projection Space Orientation

Figure 4A:
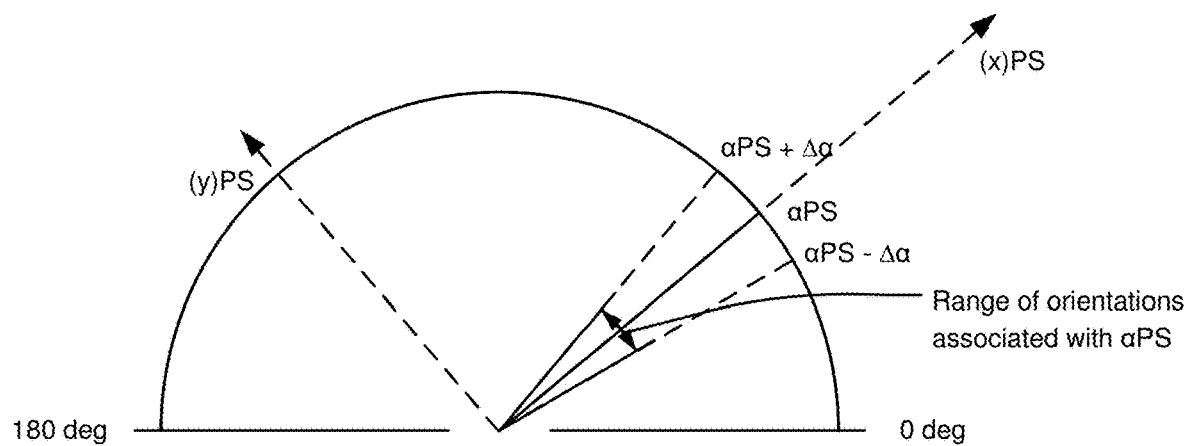
FIG. 4A illustrates an exemplary projection space orientation, in accordance with some embodiments.
Figure 4B:
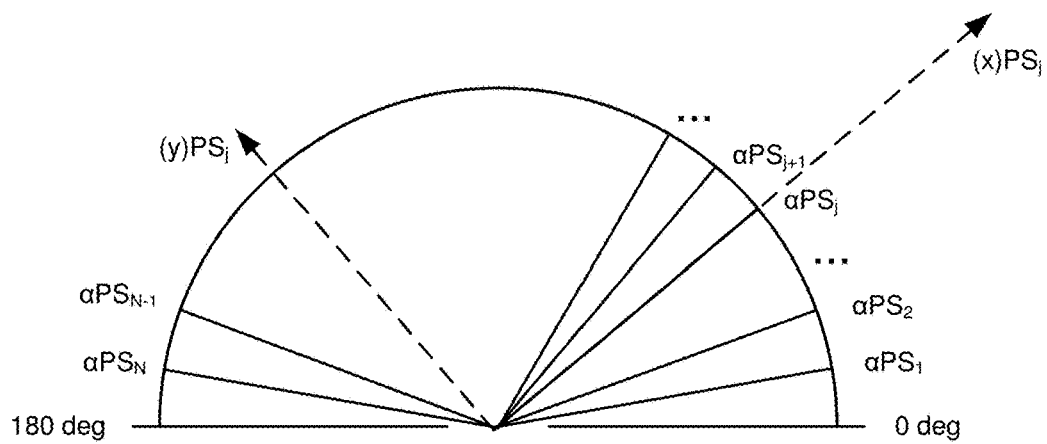
FIG. 4B illustrates exemplary projection space orientations, in accordance with some embodiments.
Figure 4C:
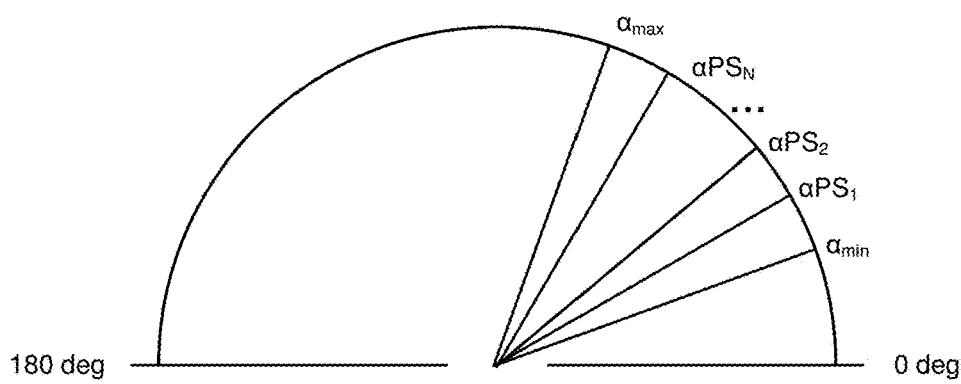
FIG. 4C illustrates exemplary projection space orientations, in accordance with some embodiments.

FIG. 4A illustrates an exemplary projection space orientation αPS that may be defined in the range [0, π] radians or [0, 180] degrees, in accordance with some embodiments. FIG. 4F illustrates an exemplary projection space orientation αPS that may be defined in the range [0, π/2] radians or [0, 90] degrees, in accordance with some embodiments. The projection space orientation αPS defines a projection space PS that has a first axis (x)PS and a second axis (y)PS perpendicular to the first axis (x)PS and the first axis (x)PS is oriented at the projection space orientation αPS. The projection space PS may have its origin in the center or in one of the corners of the image, for example.

In some embodiments, multiple projection space orientations may be defined. According to some embodiments, multiple projection space orientations αPS1, αPS2, . . . αPSN may be defined (e.g., at regular intervals) in the range [0, π] radians or [0, 180] degrees as illustrated in FIG. 4B or in the range [0, π/2] radians or [0, 90] degrees. According to some embodiments, multiple projection space orientations αPS1, αPS2, . . . αPSN may be defined (e.g., at regular intervals) in a desired range of orientations between a minimum orientation αmin and a maximum orientation αmax (e.g., determined based on information provided by a user or selected based on the image) as illustrated in FIG. 4C. In these embodiments, each projection space orientation αPSj of the set of projection space orientations defines a respective projection space PSj that has a respective first axis (x)PSj and a respective second axis (y)PSj and the respective first axis (x)PSj is oriented at the respective projection space orientation αPSj.

Figure 4D:
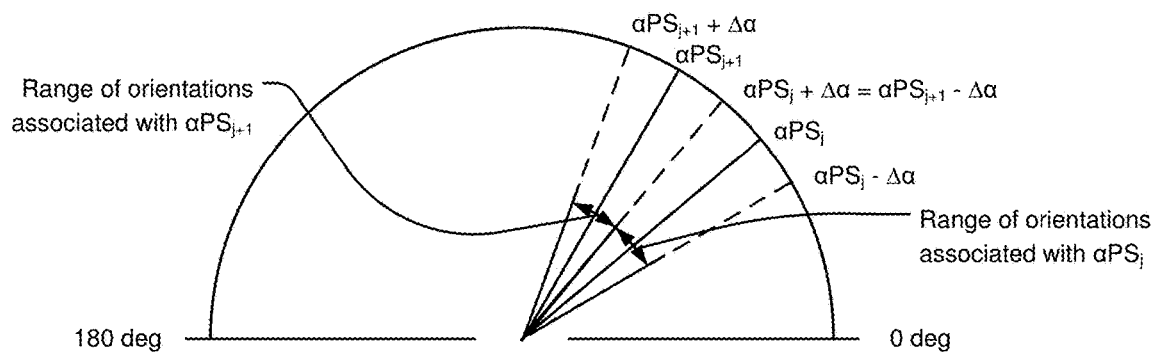
FIG. 4D illustrates exemplary projection space orientations, in accordance with some embodiments.

In some embodiments, as illustrated in FIG. 4D, the set of projection space orientations and/or the tolerance angle Δα can be selected such that the ranges of orientations associated with two neighboring projection space orientations $\alpha PS_j$ and $\alpha PS_{j+1}$ are contiguous: $\alpha PS_j + \Delta\alpha = \alpha PS_{j+1} - \Delta\alpha$. For example, parameters can be selected such that the interval between neighboring projection space orientations is twice the tolerance angle: $\alpha PS_{j+1} - \alpha PS_j = 2\Delta\alpha$. However, in this case, detected line segments whose orientations fall close to the boundary between the ranges may be projected to the wrong projection space resulting in a failed detection (e.g., some line segments composing the object may be projected to one projection space and the other line segments composing the object projected to another projection space resulting in a failed detection in both projection spaces).

Figure 4E:
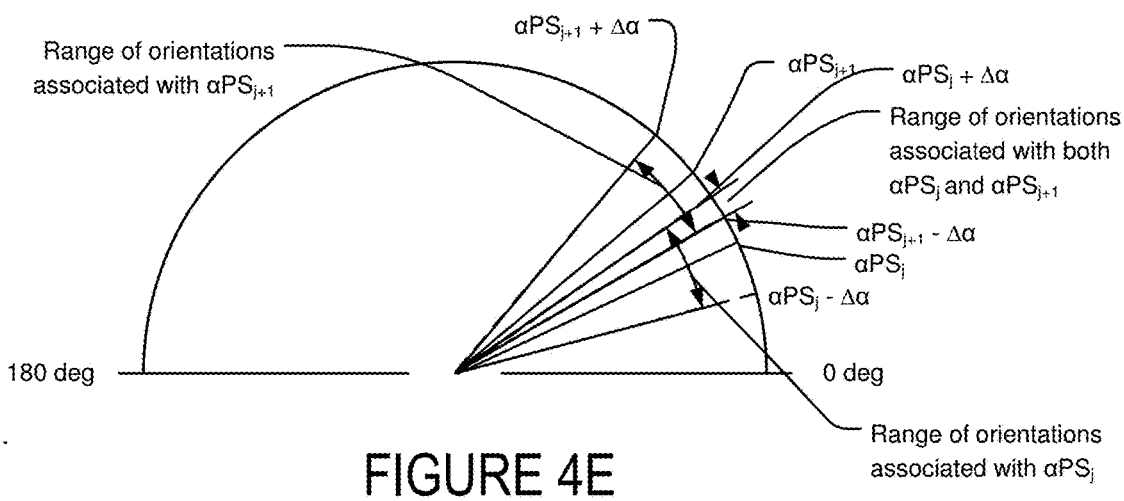
FIG. 4E illustrates exemplary projection space orientations, in accordance with some embodiments.
Figure 4F:
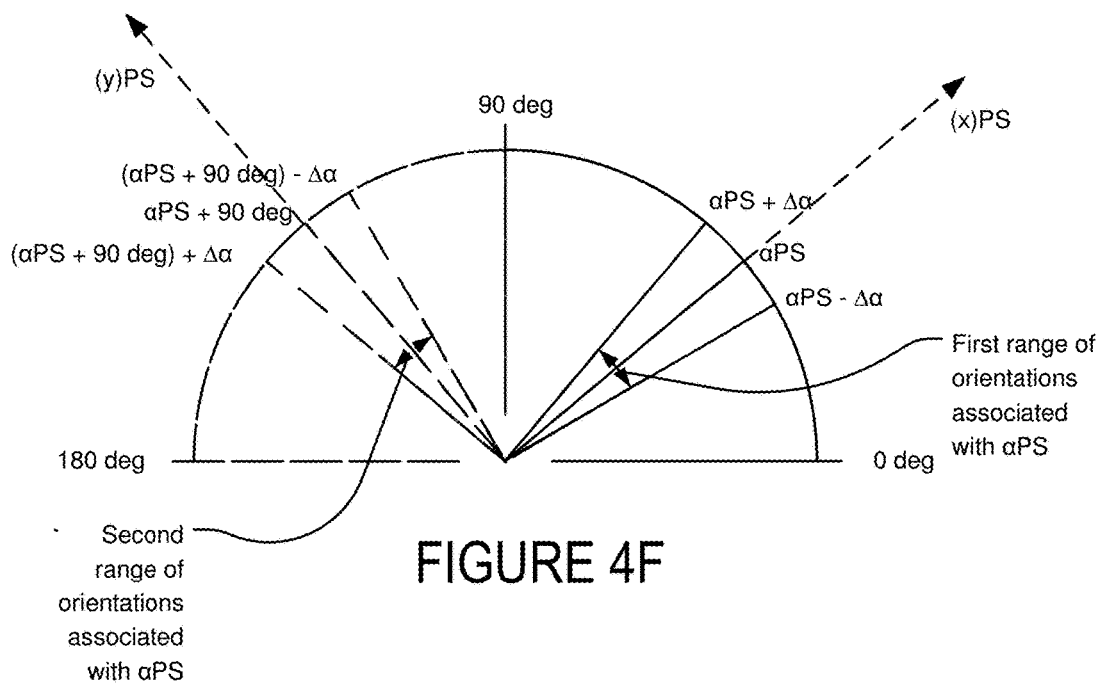
FIG. 4F illustrates an exemplary projection space orientation, in accordance with some embodiments.

To address this, in some embodiments, as illustrated in FIG. 4E, the set of projection space orientations and/or the tolerance angle Δα can be selected such that the range of orientations associated with two neighboring projection space orientations $\alpha PS_j$ and $\alpha PS_{j+1}$ overlap: $\alpha PS_j + \Delta\alpha > \alpha PS_{j+1} - \Delta\alpha$. In these embodiments, a detected line segment whose line segment orientation θ belongs to the overlapping range of orientations associated with both $\alpha PS_j$ and $\alpha PS_{j+1}$, the range $[\alpha PS_{j+1} - \Delta\alpha, \alpha PS_j + \Delta\alpha]$, will be projected to both the projection space $PS_j$ associated with projection space orientation $\alpha PS_j$ and the projection space $PS_{j+1}$ associated with projection space orientation $\alpha PS_{j+1}$. This increases the likelihood of detecting the object in at least one of the projection spaces and improves the robustness of the overall detection.

In the case of contiguous ranges (FIG. 4D), generally the likelihood of detecting an object at a particular orientation by projecting line segments of the object to the same projection space allowing for a successful detection decreases as you move away from a projection space orientation $\alpha PS_j$ towards the boundaries $\alpha PS_j + \Delta\alpha$ and $\alpha PS_j - \Delta\alpha$. To address this, in some embodiments, a projection space orientation $\alpha PS_j'$ is placed at the boundary between the ranges of each pair of neighboring projection space orientations $\alpha PS_j$ and $\alpha PS_{j+1}$ where the error is maximum. So, there is a first set of projection space orientations $\alpha PS_j$ and a second set of projection space orientations $\alpha PS_j'$, which is offset with respect to the first set of projection space orientations αPS$_j$ by the tolerance angle Δα. In other words, for a given tolerance angle, the number of projection space orientations is doubled. In this case, a detected line segment will generally be projected to two projection spaces.

In some embodiments, the tolerance angle Δα may be determined (e.g., hardcoded or selected by a user, for example) based on a desired degree of tolerance of parallelism and orthogonality. For example, a tolerance angle Δα may determine a degree to which line segments forming a line or macro line segment are allowed to zig zag or a degree to which angles of a rectangle can differ from 90 degrees allowing more general parallelogram or trapezoid shapes to be detected as instances of a rectangle, for example.

As described above with reference to FIG. 2, the projection space orientation or plurality of projection space orientations may be predetermined (such as hardcoded or selected during a setup or configuration phase based on information input by a user, for example) or may be determined for each input image based on characteristics of the image (e.g., based on a distribution of the line segment orientations of the detected line segments).

Detection of Object with Line Segments Oriented According to a First Direction

Figure 3:
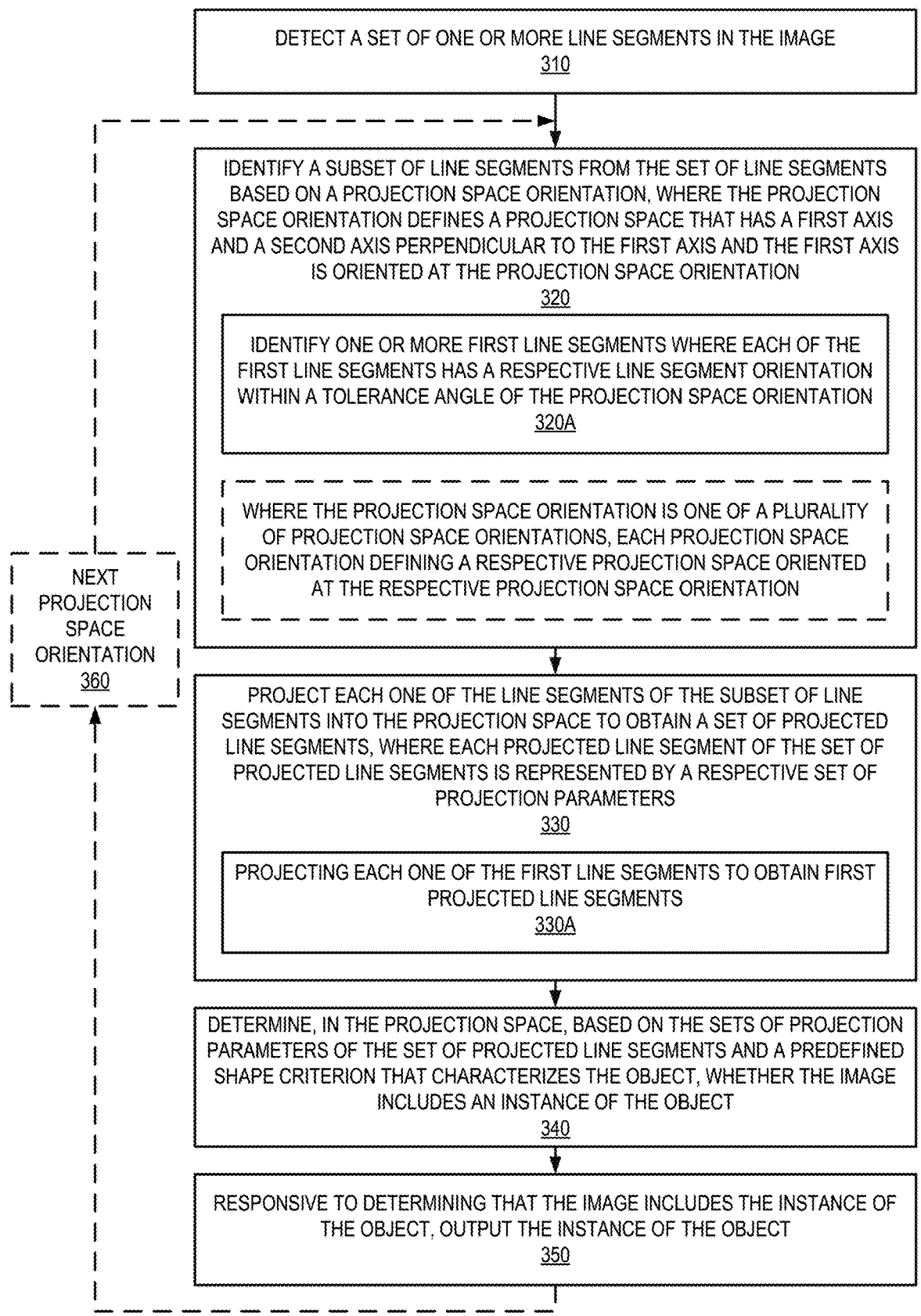
FIG. 3 illustrates a flow diagram of exemplary operations for detecting an object in an image, in accordance with some embodiments.

FIG. 3 illustrates a flow diagram of exemplary operations for detecting an object in an image, in accordance with some embodiments. FIG. 3 will be described with reference to FIG. 10, which illustrates exemplary detailed operations for detecting an object in an image in accordance with some embodiments.

Figure 10:
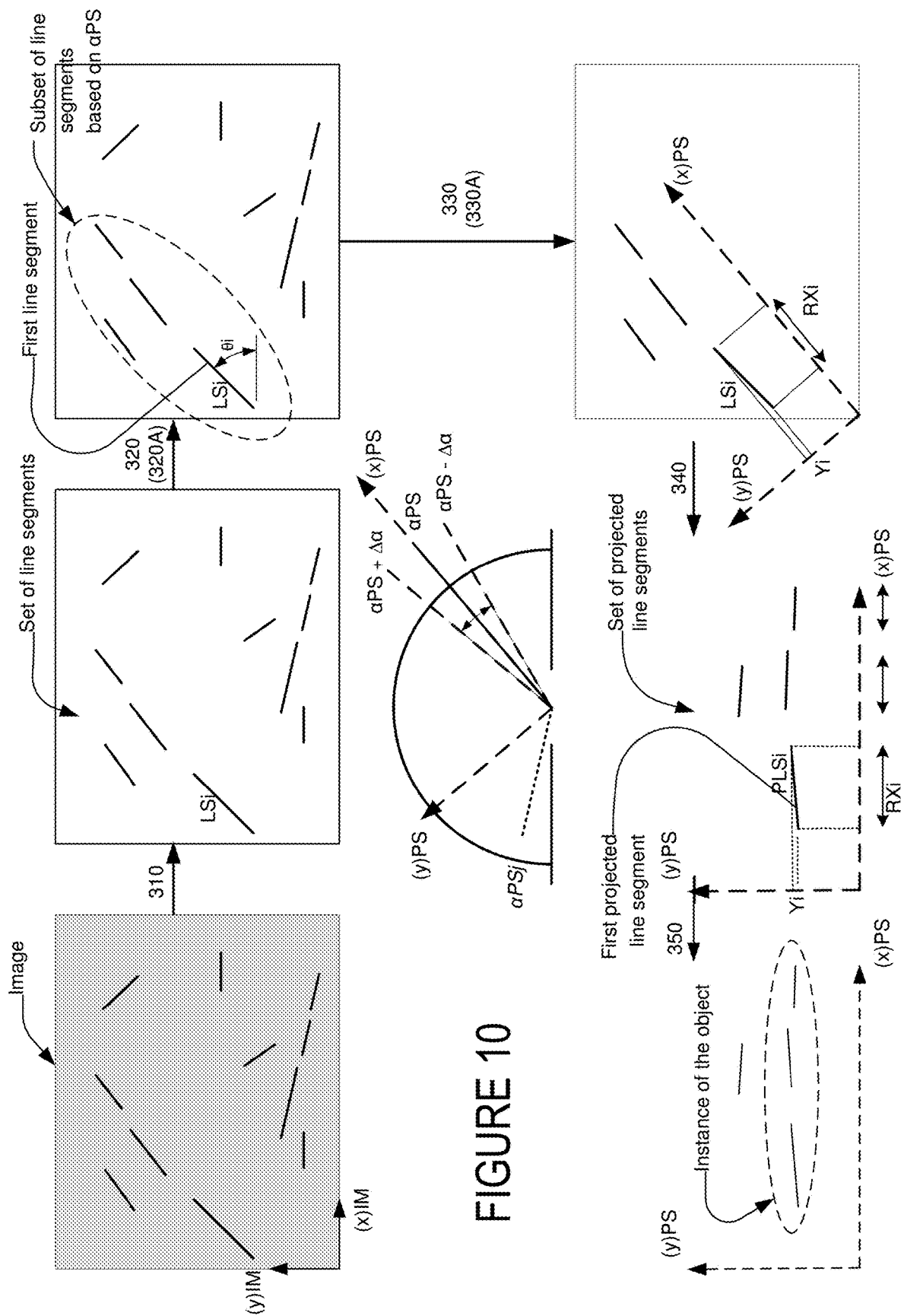
FIG. 10 illustrates exemplary detailed operations for detecting an object in an image, in accordance with some embodiments.

The operations of FIG. 3 may be used to detect an object composed of (or including) one or more line segments generally oriented in a first direction. Examples of such objects include a line or larger line segment formed of multiple generally collinear line segments (as illustrated in FIG. 10) and a stripe pattern (or set of stripes) formed of multiple generally parallel line segments whose endpoints generally line up.

The operations of FIG. 3 may be used in a variety of fields to detect and/or locate various real world objects. For example, the operations of FIG. 3 may be used in wafer defect inspection to detect, in an image of a wafer, a line segment or set of collinear line segments corresponding to a scratch (defect) on the wafer. The scratch may be oriented in any direction. In another example, the operations of FIG. 3 may be used in a package routing system to detect, in an image of a package, a stripe pattern corresponding to a 1D barcode. The barcode may appear at different orientations and also may appear at various scales (e.g., due to the height of the package).

At operation 310, a set of one or more line segments is detected in the image. The detection of the line segments can be performed as described above with reference to step 210 of FIG. 2.

At operation 320, a subset of line segments from the set of line segments is identified based on a projection space orientation. Operation 320 includes operation 320A of identifying one or more first line segments where each one of the first line segments has a respective line segment orientation within a tolerance angle of the projection space orientation. In some embodiments, the projection space orientation is defined as described above with reference to FIGS. 4A-E.

Referring to FIG. 4A, according to some embodiments, a projection space orientation αPS may be defined in the range [0, π] radians or [0, 180] degrees. According to these embodiments, operation 320 includes identifying one or more first line segments (LS)i whose line segment orientation (θ)i is within a tolerance angle Δα of the projection space orientation αPS, that is, whose line segment orientation (θ)i belongs to the range [αPS−Δα, αPS+Δα]. As described above, the projection space orientation αPS defines a projection space PS that has a first axis (x)PS and a second axis (y)PS perpendicular to the first axis (x)PS and the first axis (x)PS is oriented at the projection space orientation αPS.

At operation 330, each one of the line segments of the subset of line segments identified at operation 320 is projected into the projection space to obtain a set of projected line segments, where each projected line segment is represented by a respective set of projection parameters. Operation 330 includes operation 330A of projecting each one of the first line segments identified at operation 320A to obtain first projected line segments.

In some embodiments, operation 330A includes projecting each one of the first line segments (LS)i onto the second axis (y)PS to obtain a respective line position parameter (Yi)PS and onto the first axis (x)PS to obtain a respective segment range parameter (RXi)PS, where the respective line position parameter (Yi)PS and the respective segment range parameter (RXi)PS form the respective set of projection parameters representing the respective first projected line segment (PLS)i.

As described above, a detected line segment LS may be represented by a pair of segment endpoints (A, B). In this case, the line position parameter (Y)PS and segment range parameter (RX)PS representing a first projected line segment may be obtained by performing an orthogonal projection of the endpoints (A, B) of the line segment onto the second axis (y)PS and first axis (x)PS of the projection space, respectively. In one example, the line position parameter (Y)PS of a first projected line segment includes a pair of values [(YA)PS, (YB)PS] that corresponds to the orthogonal projections of the endpoints A and B onto the second axis (y)PS of the projection space. In another example, the line position parameter (Y)PS of a first projected line segment corresponds to an average (or mean) of the orthogonal projections (YA)PS and (YB)PS of the endpoints A and B onto the second axis (y)PS of the projection space. In one example, the segment range parameter (RX)PS of a first projected line segment includes a pair of values [(XA)PS, (XB)PS] that correspond to the orthogonal projections of the endpoints A and B onto the first axis (x)PS of the projection space.

Returning to FIG. 3, at operation 340, a determination is made, in the projection space, based on the sets of projection parameters of the set of projected line segments and a predefined shape criterion that characterizes the object, whether the image includes an instance of the object. Then, at operation 350, responsive to a determination, at operation 340, that the image includes an instance of the object, the instance of the object is output. Operations 340 and 350 may be performed according to various embodiments, as will be described further below.

In some embodiments, multiple projection space orientations can be defined. In these embodiments, the operations 320 (320A), 330 (330A), 340, and 350 may be performed (e.g., repeated) for multiple projection space orientations αPSj among the plurality of projection space orientations αPS1, αPS2, . . . αPSN (shown as operation 360).

Figure 5:
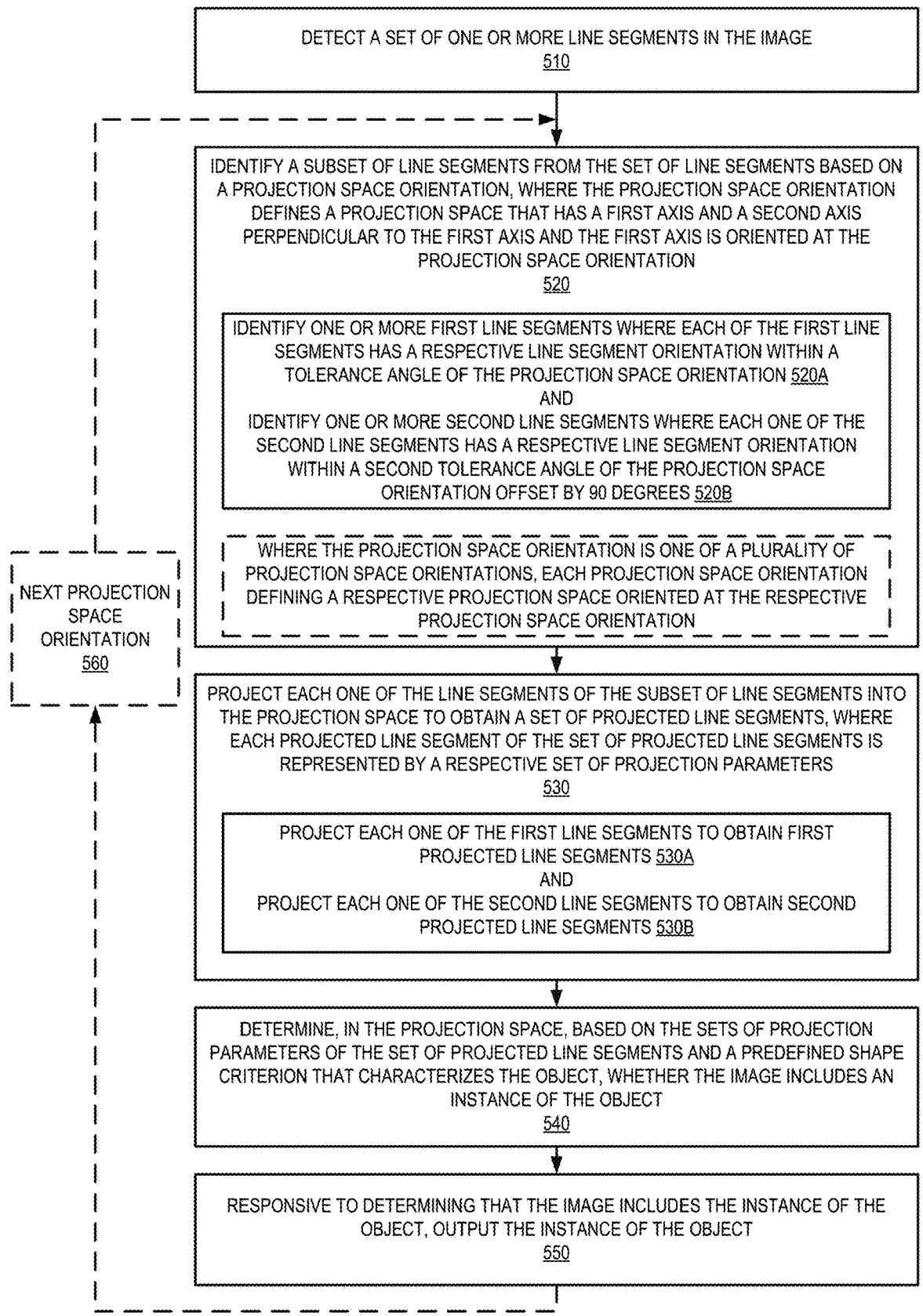
FIG. 5 illustrates a flow diagram of exemplary operations for detecting an object in an image, in accordance with some embodiments.

Detection of Object with Line Segments Oriented According to a First Direction and Second Direction FIG. 5 illustrates a flow diagram of exemplary operations for detecting an object in an image, in accordance with some embodiments. FIG. 5 will be described with reference to FIGS. 11A through 11H, which illustrate exemplary detailed operations for detecting an object in an image in accordance with some embodiments.

The operations of FIG. 5 may be used to detect an object composed of (or including) one or more line segments generally oriented in a first direction and one or more line segments generally oriented in a second direction perpendicular to the first direction. Examples of such objects include a rectangle (as illustrated in FIGS. 11A-H), a right-angled corner, and a grid pattern formed of multiple parallel and perpendicular line segments.

The operations of FIG. 5 may be used in a variety of fields to detect and/or locate various real world objects. For example, the operations of FIG. 5 may be used in integrated circuit inspection to detect, in an image of an integrated circuit, a rectangle corresponding to an IC chip. In another example, the operations may be used in various machine vision systems to locate, in an image, a right-angle corner corresponding to a fiducial marker.

Figure 11A:
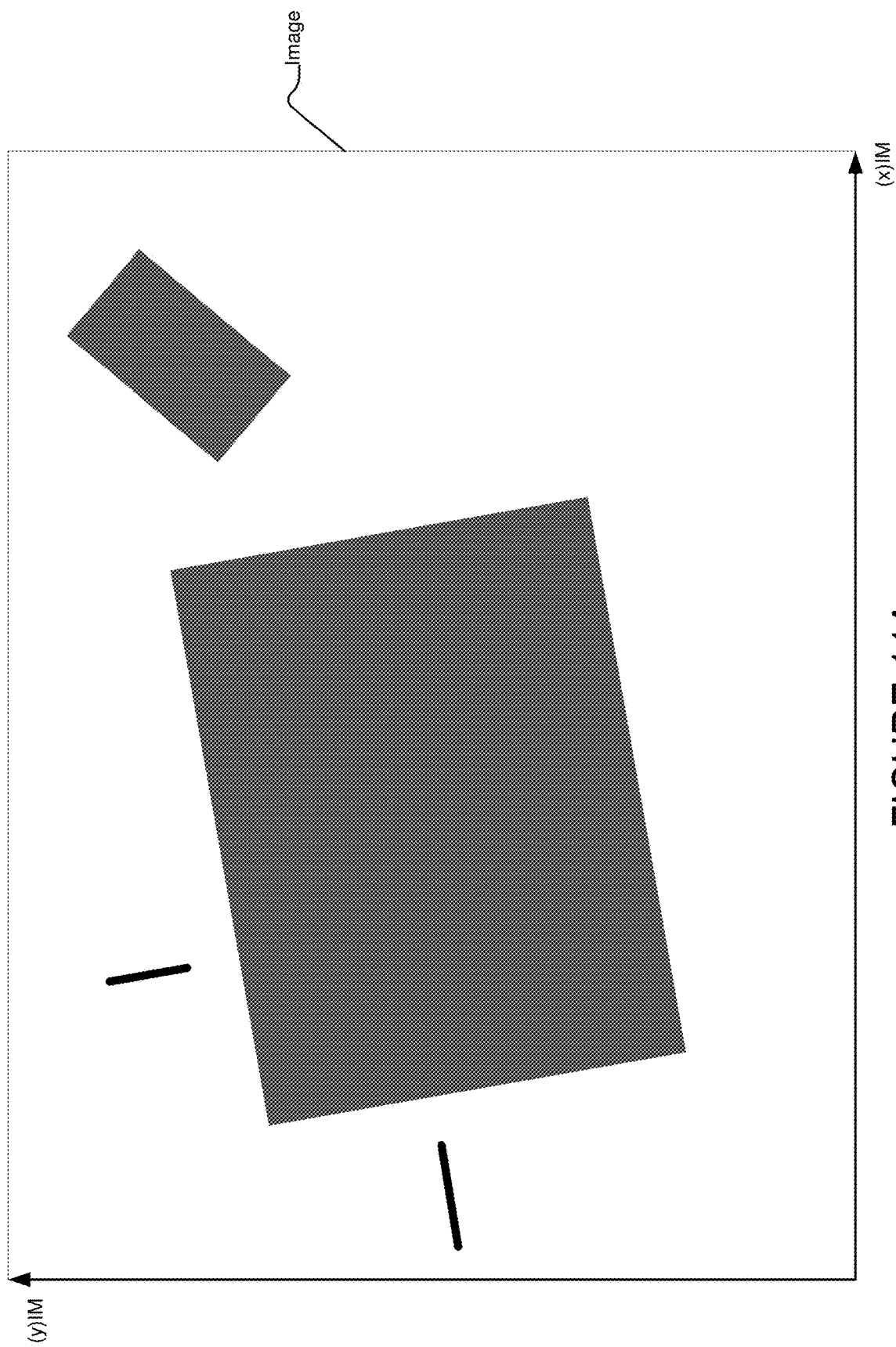
FIG. 11A illustrates exemplary detailed operations for detecting an object in an image, in accordance with some embodiments.
Figure 11B:
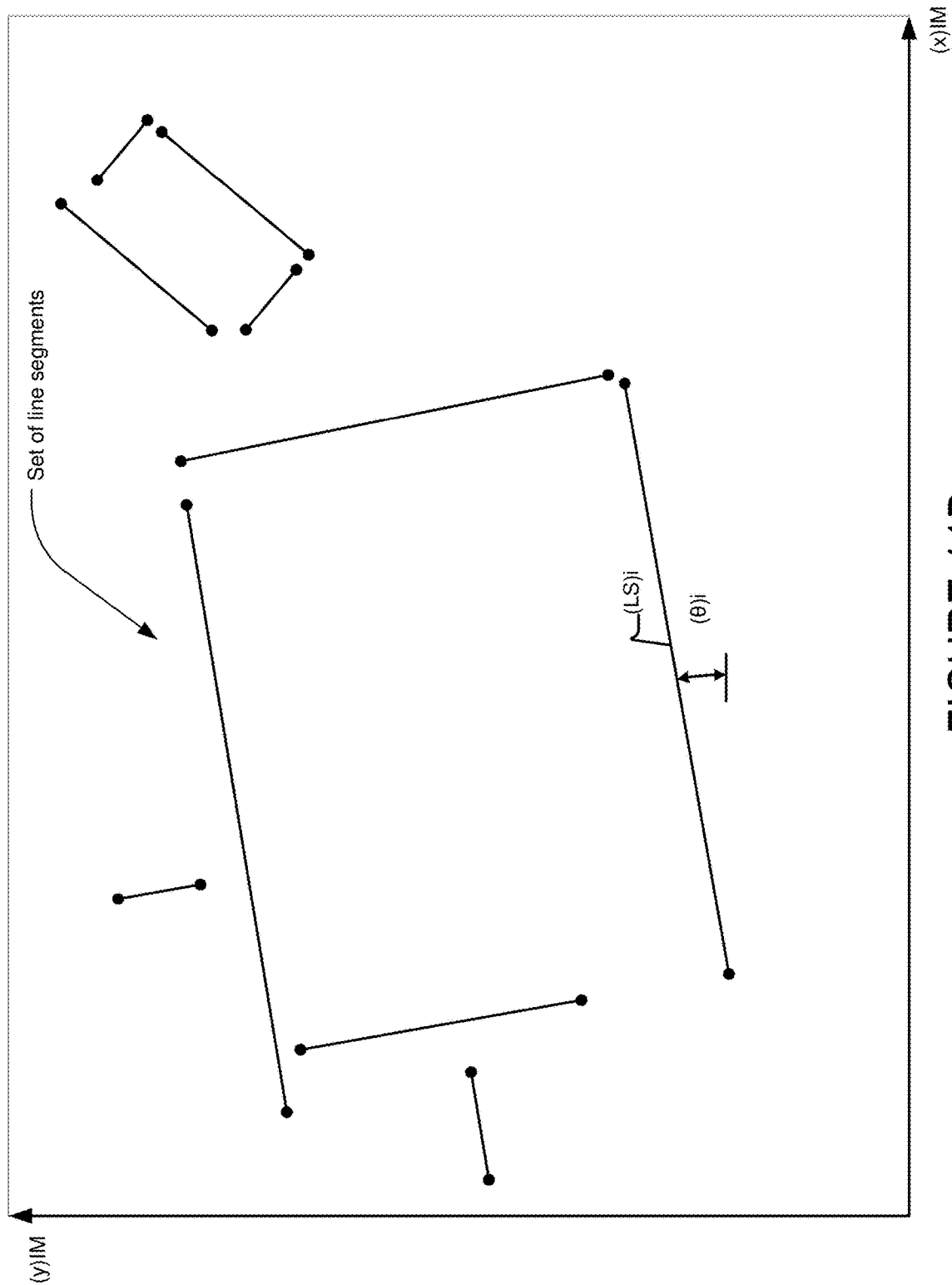
FIG. 11B illustrates exemplary detailed operations for detecting an object in an image, in accordance with some embodiments.
Figure 11C:
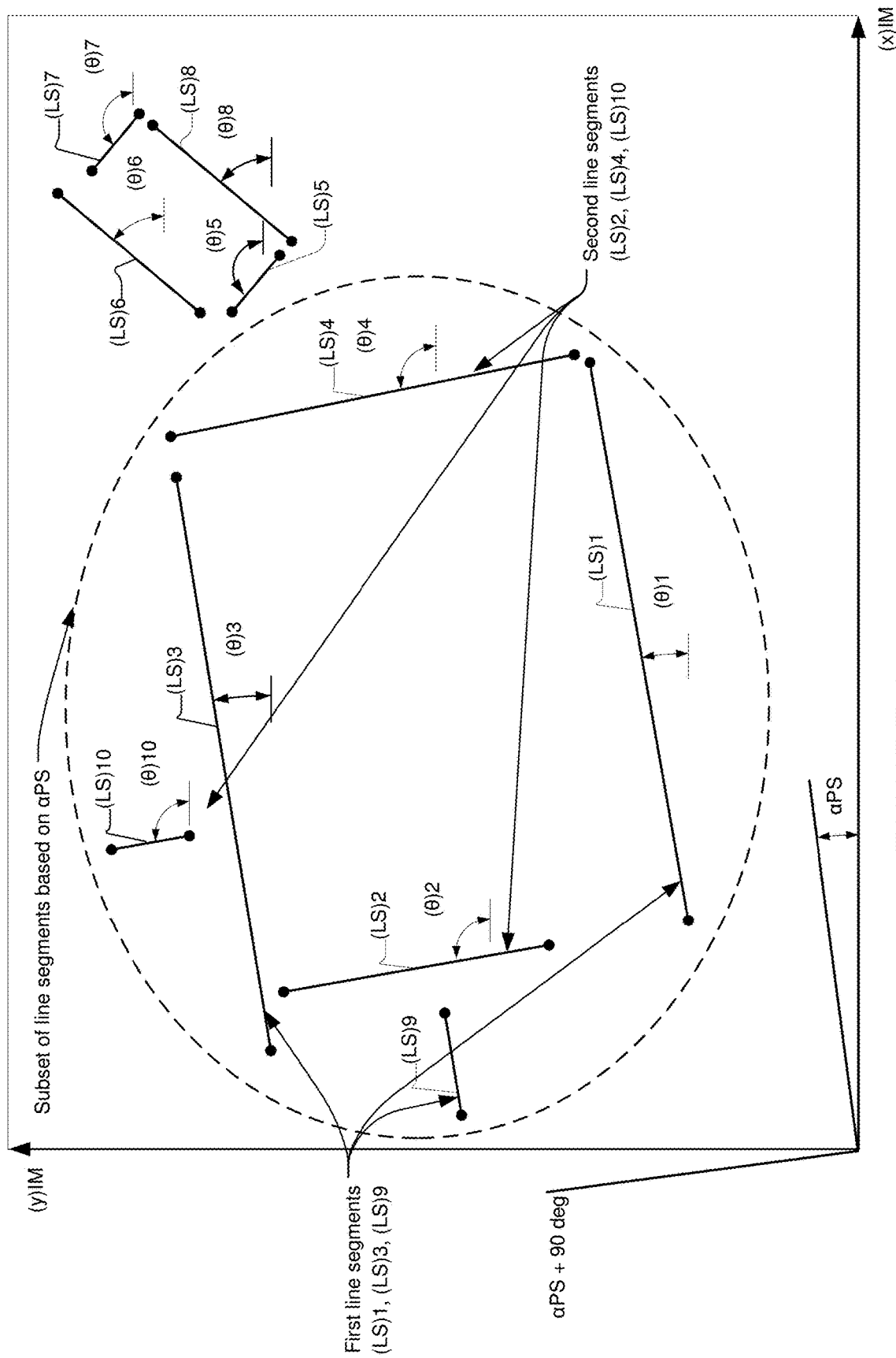
FIG. 11C illustrates exemplary detailed operations for detecting an object in an image, in accordance with some embodiments.
Figure 11D:
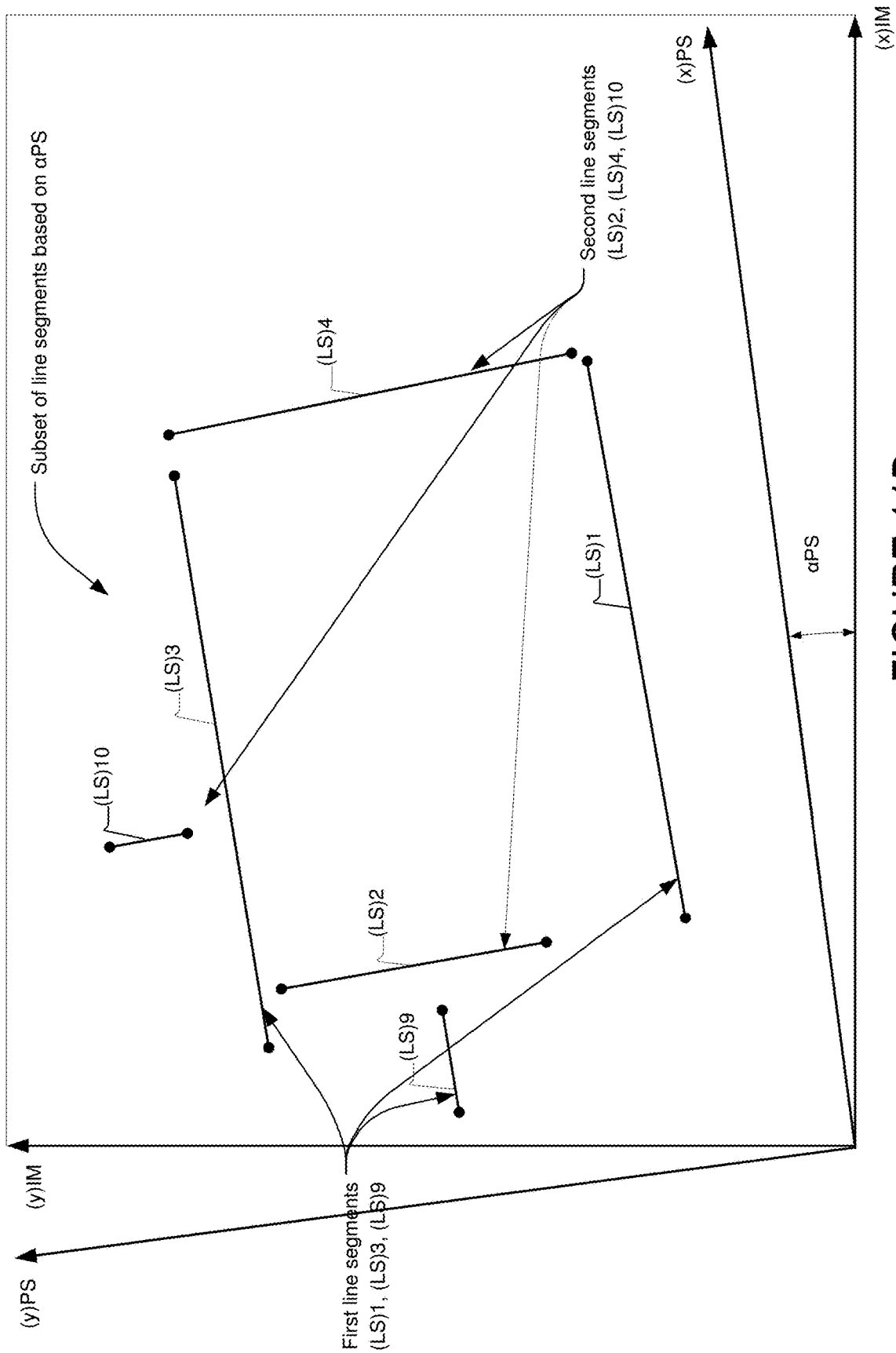
FIG. 11D illustrates exemplary detailed operations for detecting an object in an image, in accordance with some embodiments.

At operation 510, a set of one or more line segments is detected in the image (FIGS. 11A and 11B). The detection of the line segments can be performed as described above with reference to step 210 of FIG. 2.

At operation 520 (FIG. 11C), a subset of line segments from the set of line segments (detected at 510) is identified based on a projection space orientation. Operation 520 includes operation 520A that identifies one or more first line segments where each one of the first line segments has a respective line segment orientation within a tolerance angle of the projection space orientation and operation 520B that identifies one or more second line segments where each one of the second line segments has a respective line segment orientation within a second tolerance angle of the projection space orientation offset by 90 degrees. In many of the embodiments described herein, a common tolerance angle (e.g., the tolerance angle $\Delta\alpha$) is used for both the identification of the first and second line segments. In other embodiments, a first tolerance angle may be used for the identification of the first line segments and a second tolerance angle may be used for the identification of the second line segments that is different from the first tolerance angle.

One or multiple projection space orientations may be defined as described above with reference to FIGS. 4B-F. Referring to FIG. 4F, according to some embodiments, the projection space orientation $\alpha PS$ may be defined in the range $[0, \pi/2]$ radians or $[0, 90]$ degrees. In some embodiments, operation 520A identifies one or more first line segments $(LS)i$ (in the example of FIG. 11C, $(LS)1$, $(LS)3$ and $(LS)9$) whose line segment orientation $(\theta)i$ is within a tolerance angle $\Delta\alpha$ of the projection space orientation $\alpha PS$, that is, whose line segment orientation $(\theta)i$ belongs to the range $[\alpha PS-\Delta\alpha, \alpha PS+\Delta\alpha]$, a first range of orientations associated with the projection space orientation $\alpha PS$. Operation 520B identifies one or more second line segments $(LS)i$ (in the example of FIG. 11C, $(LS)2$, $(LS)4$ and $(LS)10$) where each one of the second line segments has a respective line segment orientation $(\theta)i$ within a tolerance angle $\Delta\alpha$ of the projection space orientation $\alpha PS$ offset by 90 degrees or $\pi/2$ radians, that is, whose line segment orientation $(\theta)i$ belongs to the range $[(\alpha PS+90 \text{ deg})-\Delta\alpha, (\alpha PS+90 \text{ deg})+\Delta\alpha]$ or $[(\alpha PS+\pi/2)-\Delta\alpha, (\alpha PS+\pi/2)+\Delta\alpha]$), a second range of orientations associated with the projection space orientation $\alpha PS$. As described above, the projection space orientation $\alpha PS$ defines a projection space PS that has a first axis $(x)PS$ and a second axis $(y)PS$ perpendicular to the first axis $(x)PS$ and the first axis $(x)PS$ is oriented at the projection space orientation $\alpha PS$.

At operation 530 (FIG. 11D), each one of the line segments of the subset of line segments identified at operation 520 is projected into the projection space to obtain a set of projected line segments, where each projected line segment is represented by a respective set of projection parameters. Operation 530 includes operation 530A of projecting each one of the first line segments identified at operation 520A to obtain first projected line segments and operation 530B of projecting each one of the second line segments identified at operation 520B to obtain second projected line segments.

Figure 11E:
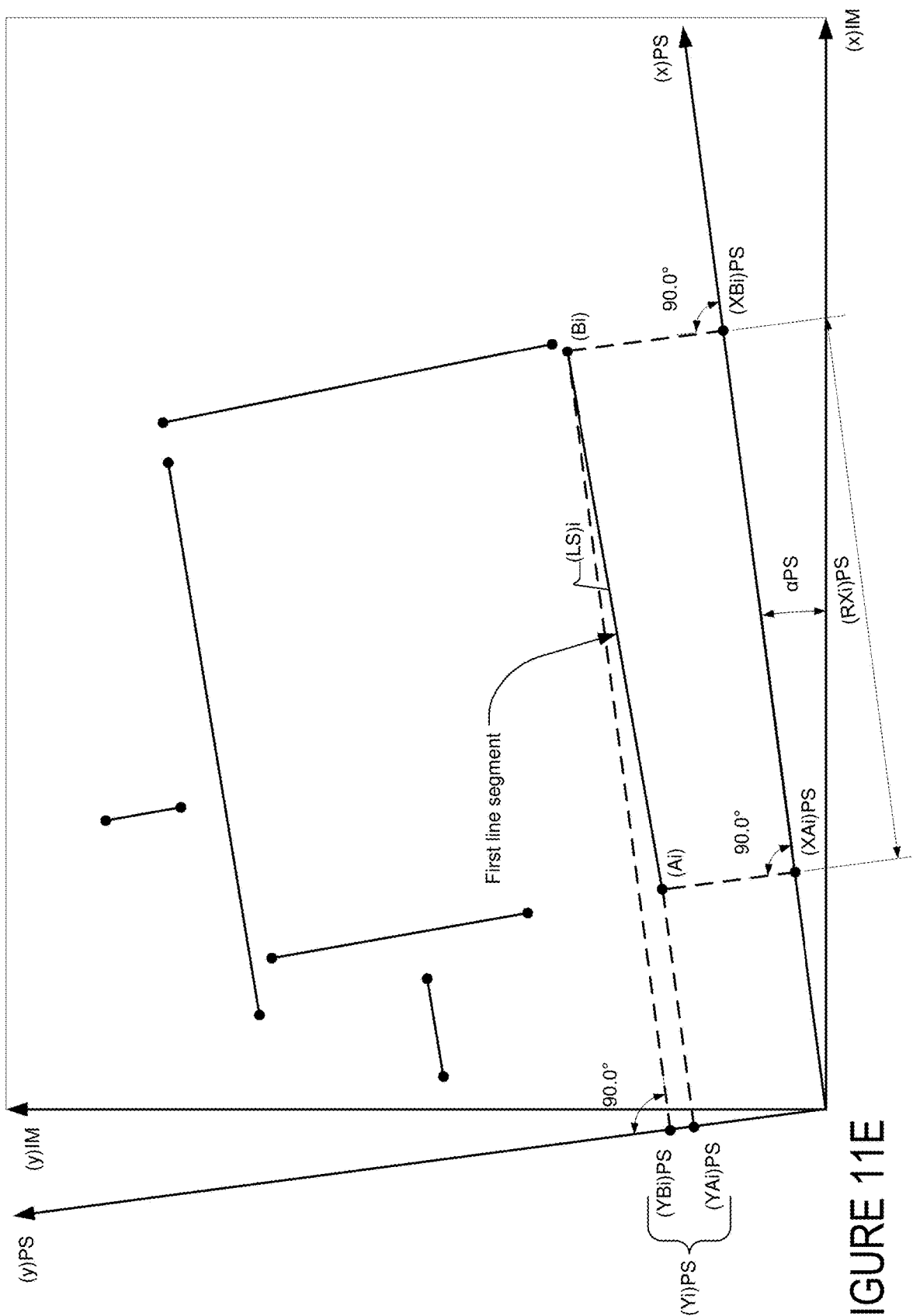
FIG. 11E illustrates exemplary detailed operations for detecting an object in an image, in accordance with some embodiments.

In some embodiments, as described above with reference to operation 330A of FIG. 3 and as illustrated in FIG. 11E, operation 530A includes projecting each one of the first line segments $(LS)i$ onto the second axis $(y)PS$ of the projection space to obtain a respective line position parameter $(Yi)PS$ and onto the first axis $(x)PS$ to obtain a respective segment range parameter $(RXi)PS$, where the respective line position parameter $(Yi)PS$ and segment range parameter $(RXi)PS$ form the respective set of projection parameters representing the respective first projected line segment $(PLS)i$. As described above, a detected line segment LS may be represented by a pair of segment endpoints $(A, B)$. In some embodiments, the line position parameter $(Y)PS$ and segment range parameter $(RX)PS$ representing a first projected line segment may be obtained by performing an orthogonal projection of the endpoints $(A, B)$ of the line segment onto the second axis $(y)PS$ and first axis $x(PS)$ of the projection space, respectively. In one example, the line position parameter $(Y)PS$ of a first projected line segment includes a pair of values $[(YA)PS, (YB)PS]$ that correspond to the orthogonal projections of the endpoints A and B onto the second axis $(y)PS$ of the projection space. In another example, the line position parameter $(Y)PS$ of a first projected line segment corresponds to an average (or mean) of the orthogonal projections $(YA)PS$ and $(YB)PS$ of the endpoints A and B onto the second axis $(y)PS$ of the projection space. In one example, the segment range parameter $(RX)PS$ of a first projected line segment includes a pair of values $[(XA)PS, (XB)PS]$ that correspond to the orthogonal projections of the endpoints A and B onto the first axis $(x)PS$ of the projection space.

Figure 11F:
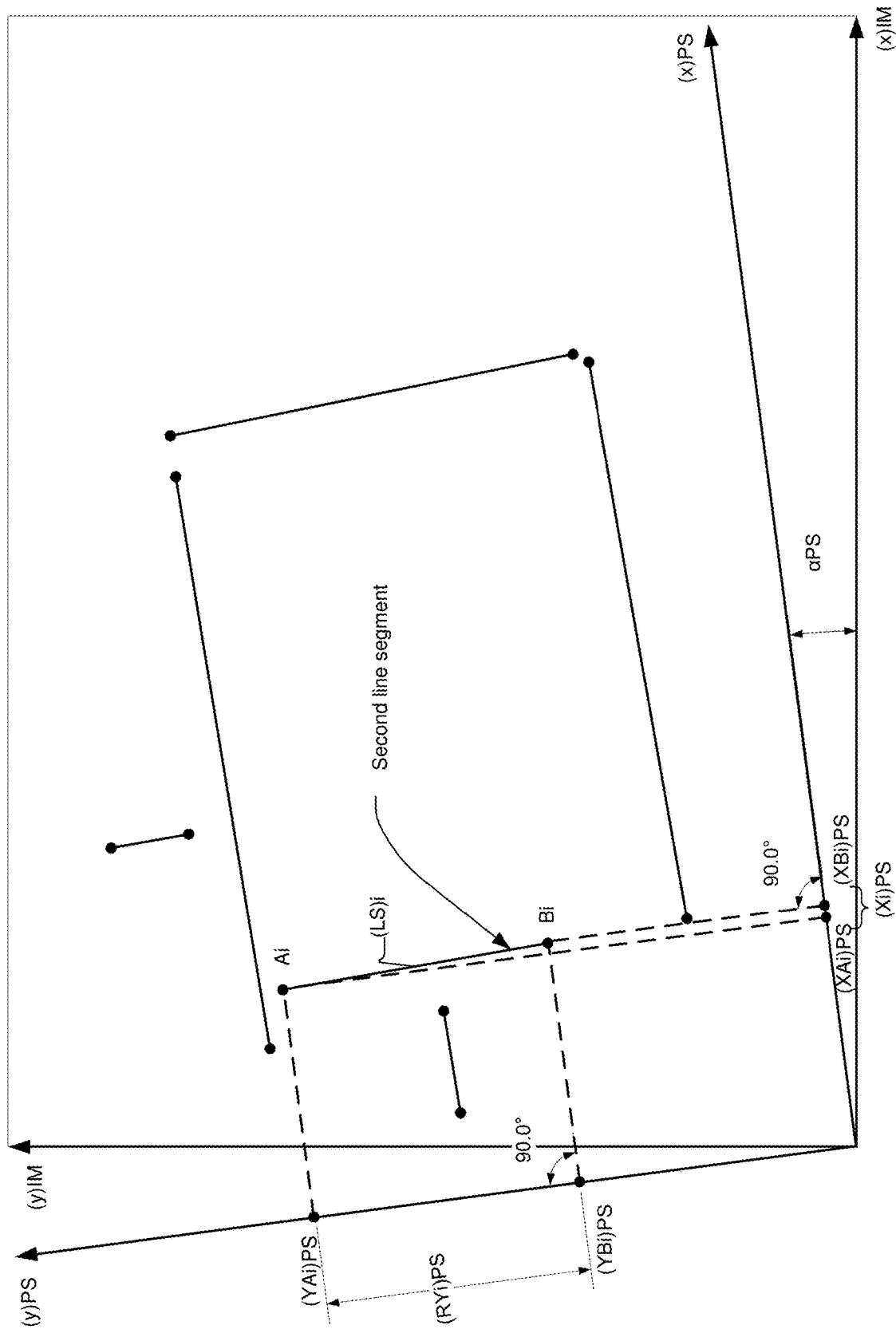
FIG. 11F illustrates exemplary detailed operations for detecting an object in an image, in accordance with some embodiments.

Returning to FIG. 5, in some embodiments, as illustrated in FIG. 11F, operation 530B includes projecting each one of the second line segments $(LS)i$ onto the first axis $(x)PS$ of the projection space to obtain a respective line position parameter $(Xi)PS$ and onto the second axis $(y)PS$ to obtain a respective segment range parameter $(RYi)PS$, where the respective line position parameter $(Xi)PS$ and segment range parameter $(RYi)PS$ form the respective set of projection parameters representing the respective second projected line segment $(PLS)i$. As described above, a detected line segment LS may be represented by a pair of segment endpoints $(A, B)$. In some embodiments, the line position parameter $(X)PS$ and segment range parameter $(RY)PS$ representing a second projected line segment may be obtained by performing an orthogonal projection of the endpoints $(A, B)$ of the line segment onto the first axis $(x)PS$ and second axis $y(PS)$ of the projection space, respectively. In one example, the line position parameter $(X)PS$ of a second projected line segment includes a pair of values $[(XA)PS, (XB)PS]$ that correspond to the orthogonal projections of the endpoints A and B onto the first axis $(x)PS$ of the projection space. In another example, the line position parameter $(X)PS$ of a second projected line segment corresponds to an average (or mean) of the orthogonal projections $(XA)PS$ and $(XB)PS$ of the endpoints A and B onto the first axis $(x)PS$ of the projection space. In one example, the segment range parameter $(RY)PS$ of a second projected line segment includes a pair of values [(YA)PS, (YB)PS] that correspond to the orthogonal projections of the endpoints A and B onto the second axis (y)PS of the projection space.

Figure 11G:
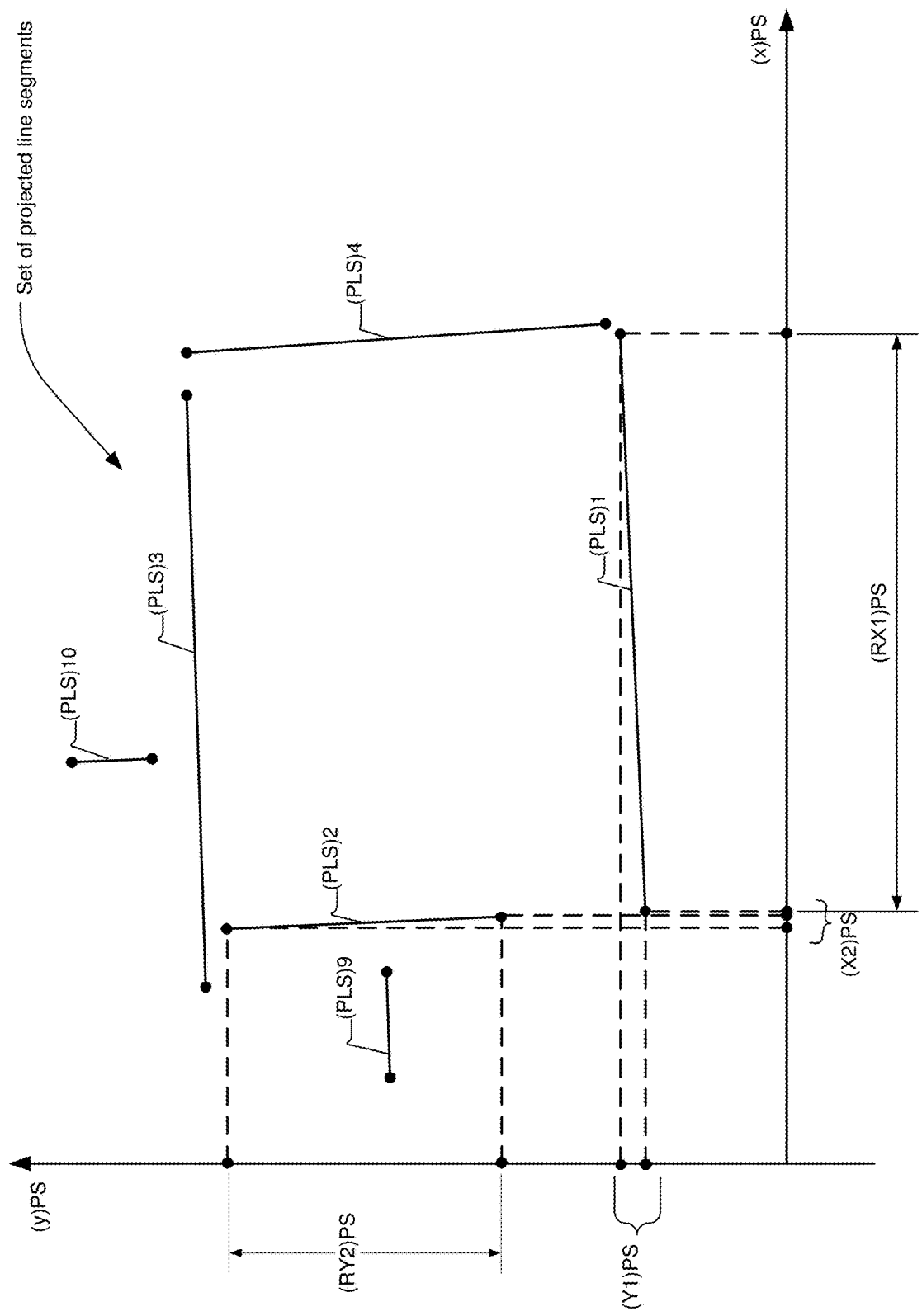
FIG. 11G illustrates exemplary detailed operations for detecting an object in an image, in accordance with some embodiments.
Figure 11H:
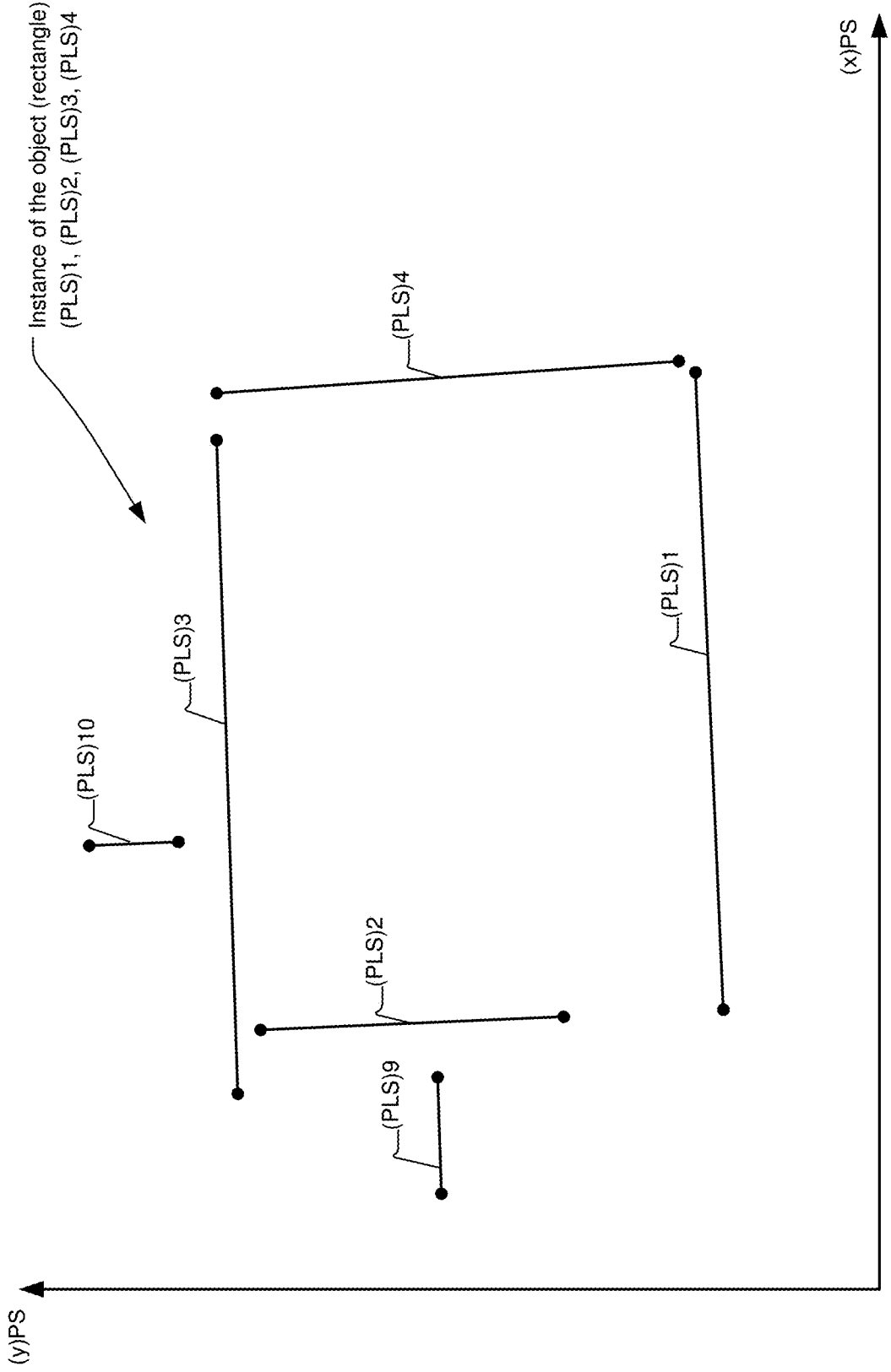
FIG. 11H illustrates exemplary detailed operations for detecting an object in an image, in accordance with some embodiments.

Returning to FIG. 5, at operation 540, as illustrated in FIG. 11G, a determination is made, in the projection space, based on the sets of projection parameters (e.g., the set (Yi)PS and (RXi)PS or the set (Xi)PS and (RYi)PS) of the set of projected line segments (PLS)i and a predefined shape criterion that characterizes the object, whether the image includes an instance of the object. Then, at operation 550, as illustrated in FIG. 11H, responsive to a determination, at operation 540, that the image includes an instance of the object, the instance of the object is output. In the example of FIGS. 11A-H, an instance of the object (a rectangle) was detected in the projection space for projection space orientation αPS. In the example, the instance of the rectangle is composed of projected line segments (PLS)1, (PLS)2, (PLS)3 and (PLS)4 in the projection space corresponding to line segments (LS)1, (LS)2, (LS)3 and (LS)4 detected in the image. Operations 540 and 550 may be performed according to various embodiments, as will be described further below.

In some embodiments, multiple projection space orientations can be defined. In these embodiments, the operations 520 (520A-B), 530 (530A-B), 540, and 550 may be performed (e.g., repeated) for multiple projection space orientations αPSj among the plurality of projection space orientations αPS1, αPS2, . . . αPSN (shown as operation 560). For example, returning to FIG. 11C, the process could be repeated for a second projection space orientation αPS2 (not shown) resulting in the detection of an instance of a rectangle in the projection space PS2 corresponding to line segments (LS)5, (LS)6, (LS)7 and (LS)8.

The embodiments described herein may be employed in many fields, such as but not limited to, industrial automation and quality assurance, surveillance, law enforcement, and transportation. For example, the embodiments may be used in a machine vision system to locate objects in a station of an industrial production line. The located objects may then be automatically picked and placed by robotic equipment or may be further inspected, measured, sorted or counted by the machine vision system. Other possible applications of the embodiments of the invention described herein will be readily understood.

Returning to FIG. 3, as described above, at operation 340, a determination is made, in the projection space, based on the sets of projection parameters (e.g., the set (Yi)PS and (RXi)PS) of the set of projected line segments (PLS)i and a predefined shape criterion that characterizes the object, whether the image includes an instance of the object. Then, at operation 350, responsive to a determination that the image includes an instance of the object, the instance of the object is output.

Figure 6:
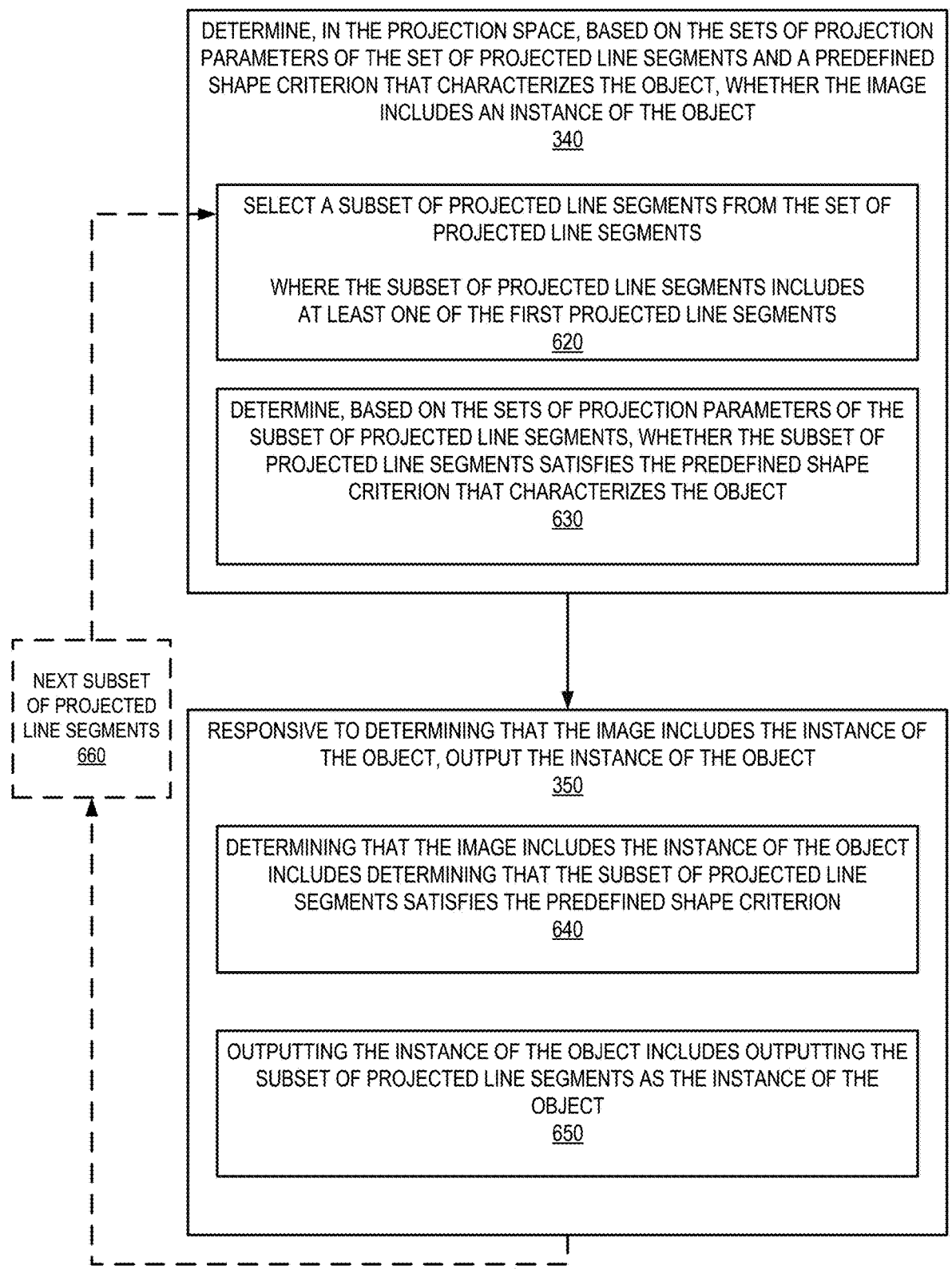
FIG. 6 illustrates a flow diagram of exemplary operations for performing operations 340 and 350 of FIG. 3, in accordance with some embodiments.

FIG. 6 illustrates a flow diagram of exemplary operations for performing operations 340 and 350 of FIG. 3, in accordance with some embodiments.

Referring to FIG. 6, in some embodiments, operation 340 includes selecting a subset of projected line segments from the set of projected line segments where the subset of projected line segments includes at least one of the first projected line segments (at operation 620) and determining, based on the sets of projection parameters of the subset of projected line segments, whether the subset of projected line segments satisfies the predefined shape criterion that characterizes the object (at operation 630).

Then, at operation 350, determining that the image includes the instance of the object includes determining that the subset of projected line segments satisfies the predefined shape criterion (at operation 640) and outputting the instance of the object includes outputting the subset of projected line segments as the instance of the object (at operation 650).

In some embodiments, the subset of projected line segments (selected at operation 620) is one among multiple subsets of projected line segments that are selected. In these embodiments, operations 620, 630, 640 and 650 may be performed (e.g., repeated) for each of the subsets of projected line segments (shown as operation 660).

Figure 7:
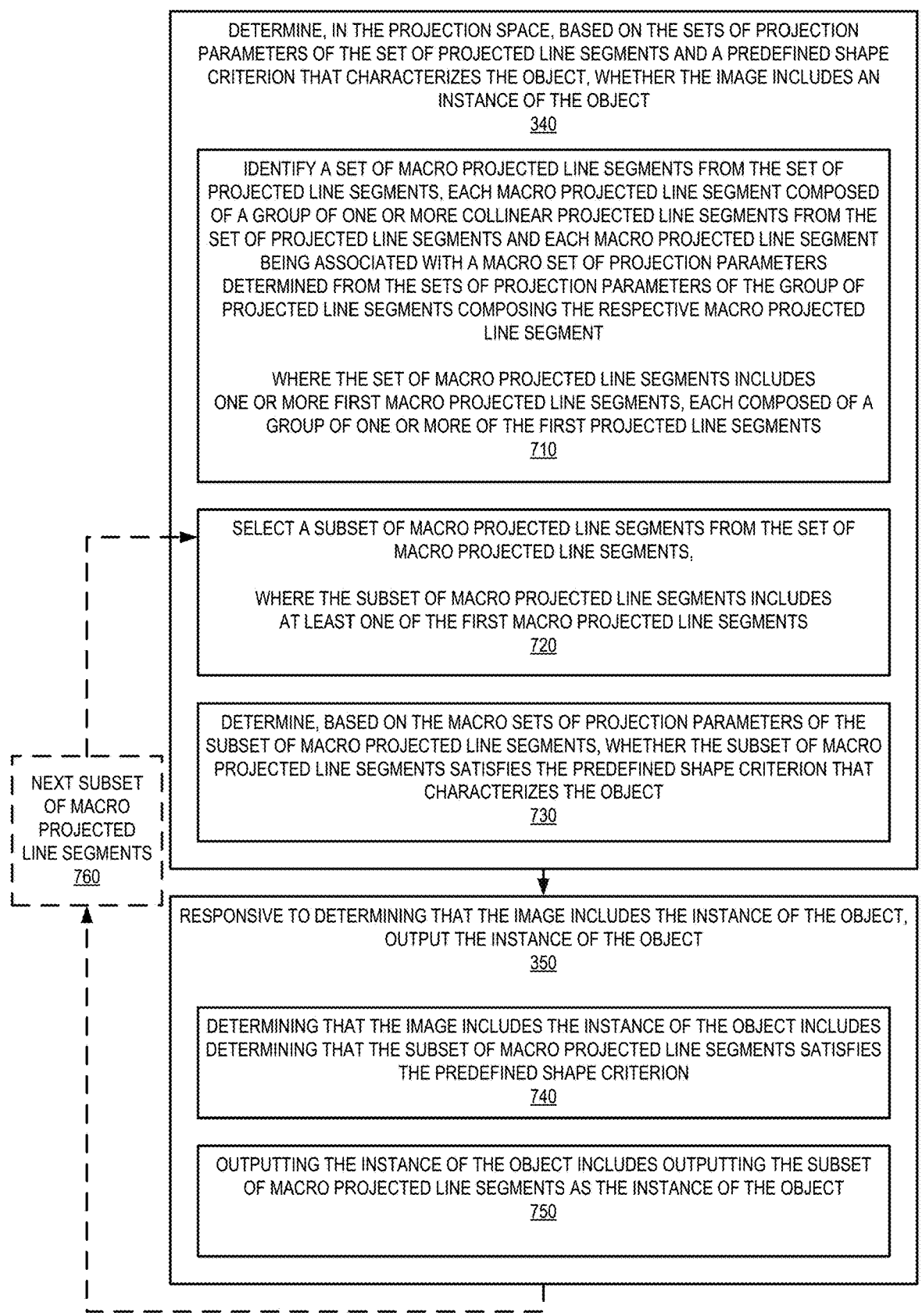
FIG. 7 illustrates a flow diagram of exemplary operations for performing operations 340 and 350 of FIG. 3, in accordance with some embodiments.

FIG. 7 illustrates a flow diagram of exemplary operations for performing operations 340 and 350 of FIG. 3, in accordance with some embodiments.

Referring to FIG. 7, in some embodiments, operation 340 begins with identifying a set of macro projected line segments from the set of projected line segments (at operation 710). Each macro projected line segment is composed of a group of one or more collinear projected line segments from the set of projected line segments. Further, each macro projected line segment is associated with a macro set of projection parameters determined from the sets of projection parameters of the group of projected line segments composing the respective macro projected line segment. The set of macro projected line segments includes one or more first macro projected line segments, each composed of a group of one or more of the first projected line segments.

In some embodiments, the macro set of projection parameters associated with a macro projected line segment includes a macro line position parameter and a macro segment range parameter. The macro line position parameter is determined from the line position parameters of the group of projected line segments composing the respective macro projected line segment. The macro segment range parameter is determined from the segment range parameters of the group of projected line segments composing the respective macro projected line segment.

Then, operation 340 includes selecting a subset of macro projected line segments from the set of macro projected line segments (at operation 720). The subset of macro projected line segments includes at least one of the first macro projected line segments. Finally, operation 340 includes determining, based on the macro sets of projection parameters of the subset of macro projected line segments, whether the subset of macro projected line segments satisfies the predefined shape criterion that characterizes the object (at operation 730).

Then, at operation 350, determining that the image includes the instance of the object includes determining that the subset of macro projected line segments satisfies the predefined shape criterion (at operation 740) and outputting the instance of the object includes outputting the subset of macro projected line segments as the instance of the object (at operation 750).

In some embodiments, the subset of macro projected line segments (selected at operation 720) is one among multiple subsets of macro projected line segments that are selected. In these embodiments, operations 720, 730, 740 and 750 may be performed (e.g., repeated) for each of the subsets of macro projected line segments (shown as operation 760).

Returning to FIG. 5, as described above, at operation 540, a determination is made, in the projection space, based on the sets of projection parameters (e.g., the set (Yi)PS and (RXi)PS or the set (Xi)PS and (RYi)PS) of the set of projected line segments (PLS)i and a predefined shape criterion that characterizes the object, whether the image includes an instance of the object. Then, at operation 550, responsive to a determination that the image includes an instance of the object, the instance of the object is output.

Figure 8:
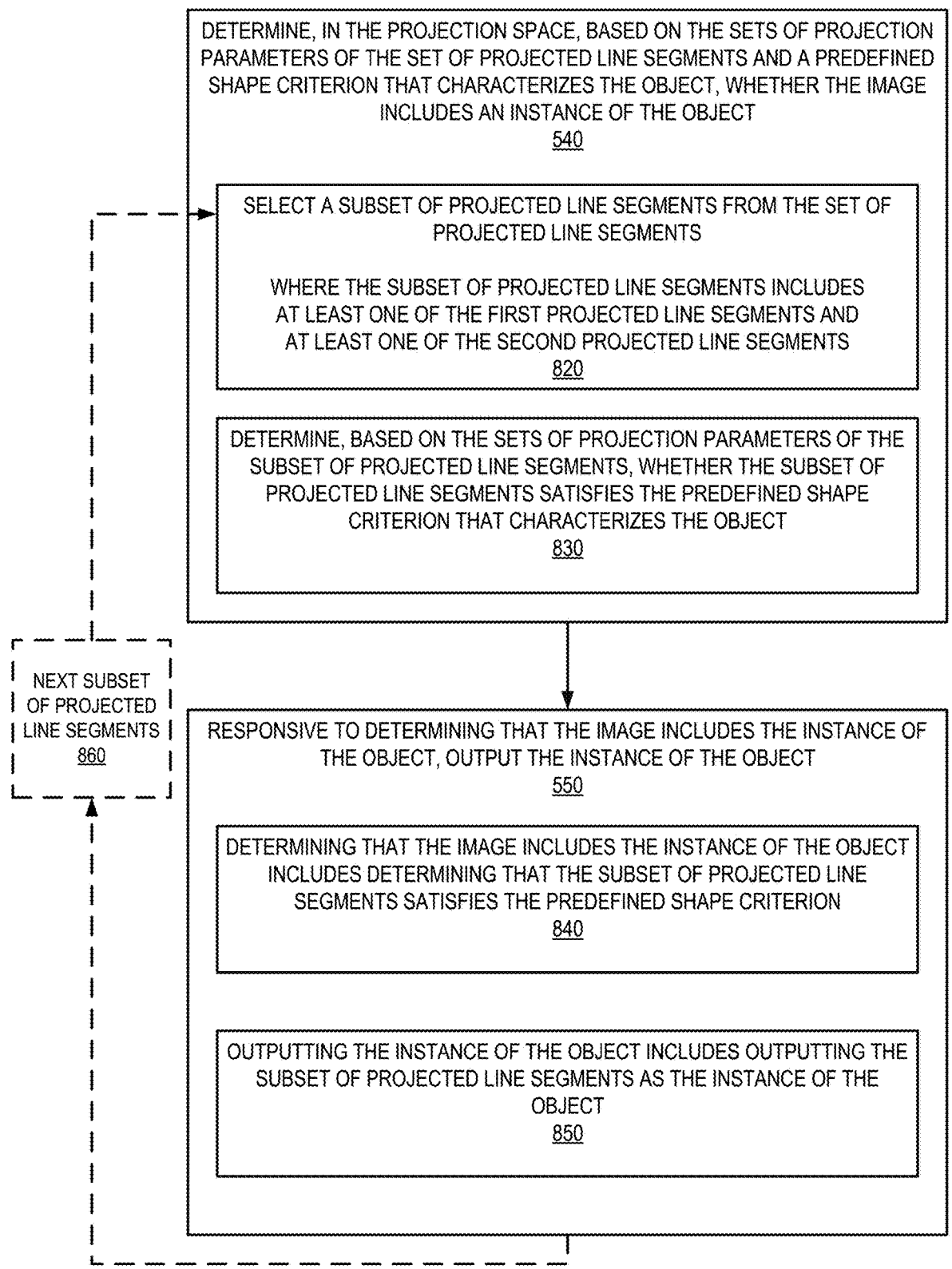
FIG. 8 illustrates a flow diagram of exemplary operations for performing operations 540 and 550 of FIG. 5, in accordance with some embodiments.

FIG. 8 illustrates a flow diagram of exemplary operations for performing operations 540 and 550 of FIG. 5, in accordance with some embodiments.

Referring to FIG. 8, in some embodiments, operation 540 includes selecting a subset of projected line segments from the set of projected line segments (PLS)i where the subset of projected line segments includes at least one of the first projected line segments and at least one of the second projected line segments (at operation 820) and determining, based on the sets of projection parameters of the subset of projected line segments, whether the subset of projected line segments satisfies the predefined shape criterion that characterizes the object (at operation 830).

Then, at operation 550, determining that the image includes the instance of the object includes determining that the subset of projected line segments satisfies the predefined shape criterion (at operation 840) and outputting the instance of the object includes outputting the subset of projected line segments as the instance of the object (at operation 850).

In some embodiments, the subset of projected line segments (selected at operation 820) is one among multiple subsets of projected line segments that are selected. In these embodiments, operations 820, 830, 840 and 850 may be performed (e.g., repeated) for each of the subsets of projected line segments (shown as operation 860).

Figure 9:
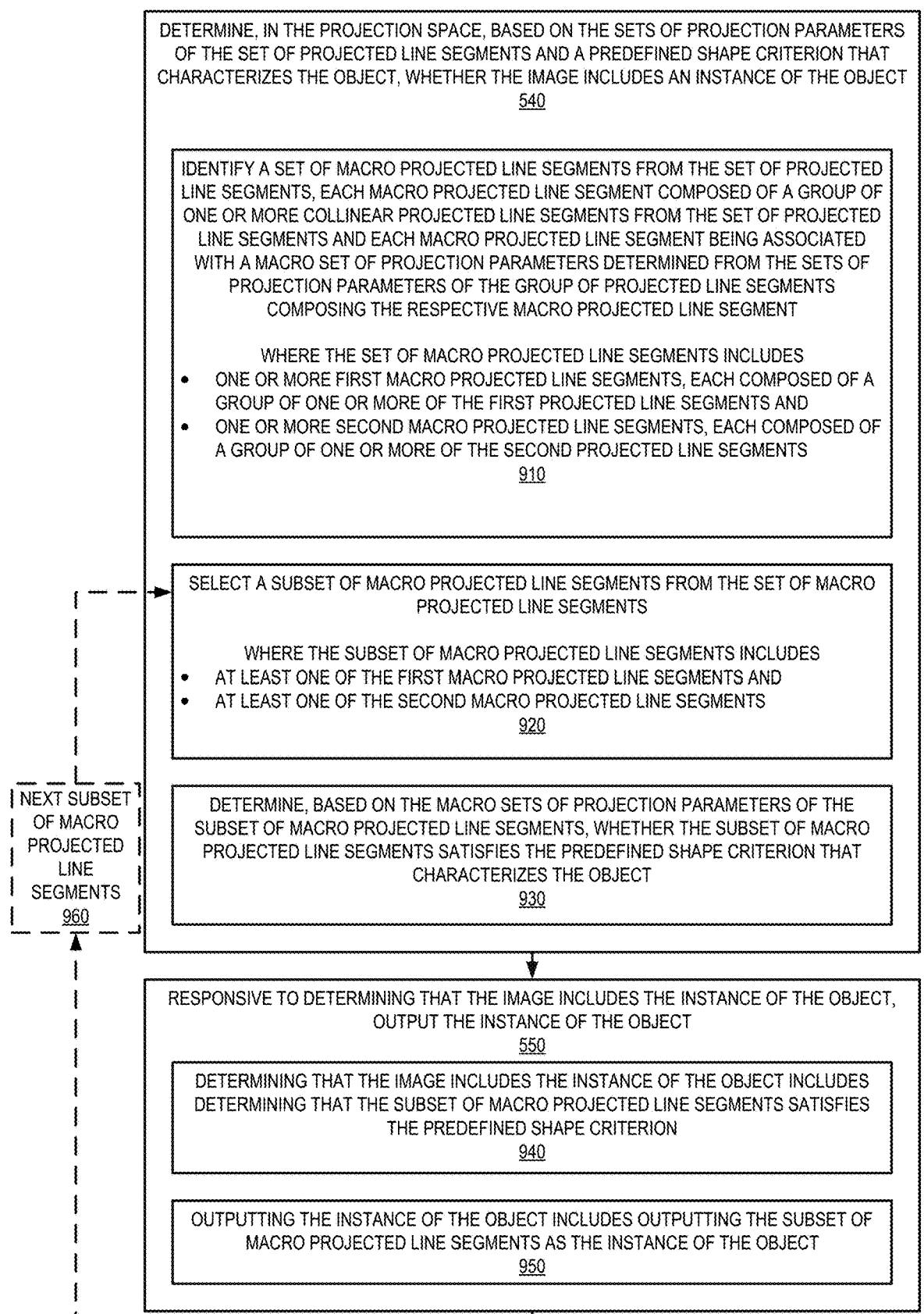
FIG. 9 illustrates a flow diagram of exemplary operations for performing operations 540 and 550 of FIG. 5, in accordance with some embodiments.

FIG. 9 illustrates a flow diagram of exemplary operations for performing operations 540 and 550 of FIG. 5, in accordance with some embodiments.

Referring to FIG. 9, in some embodiments, operation 540 begins with identifying a set of macro projected line segments from the set of projected line segments (at operation 910). Each macro projected line segment is composed of a group of one or more collinear projected line segments from the set of projected line segments. Further, each macro projected line segment is associated with a macro set of projection parameters determined from the sets of projection parameters of the group of projected line segments composing the respective macro projected line segment. The set of macro projected line segments includes one or more first macro projected line segments (each composed of a group of one or more of the first projected line segments) and one or more second macro projected line segments (each composed of a group of one or more of the second projected line segments).

In some embodiments, the macro set of projection parameters associated with a macro projected line segment includes a macro line position parameter and a macro segment range parameter. The macro line position parameter is determined from the line position parameters of the group of projected line segments composing the respective macro projected line segment. The macro segment range parameter is determined from the segment range parameters of the group of projected line segments composing the respective macro projected line segment.

Then, operation 540 includes selecting a subset of macro projected line segments from the set of macro projected line segments (at operation 920). The subset of macro projected line segments includes at least one of the first macro projected line segments and at least one of the second macro projected line segments. Finally, operation 540 includes determining, based on the macro sets of projection parameters of the subset of macro projected line segments, whether the subset of macro projected line segments satisfies the predefined shape criterion that characterizes the object (at operation 930).

Then, at operation 550, determining that the image includes the instance of the object includes determining that the subset of macro projected line segments satisfies the predefined shape criterion (at operation 940) and outputting the instance of the object includes outputting the subset of macro projected line segments as the instance of the object (at operation 950).

In some embodiments, the subset of macro projected line segments (selected at operation 920) is one among multiple subsets of macro projected line segments that are selected. In these embodiments, operations 920, 930, 940 and 950 may be performed (e.g., repeated) for each of the subsets of macro projected line segments (shown as operation 960).

In some embodiments, the operations for detecting an object in an image described above with reference to FIG. 5 and FIG. 8 are used to detect a rectangle.

Figure 12A:
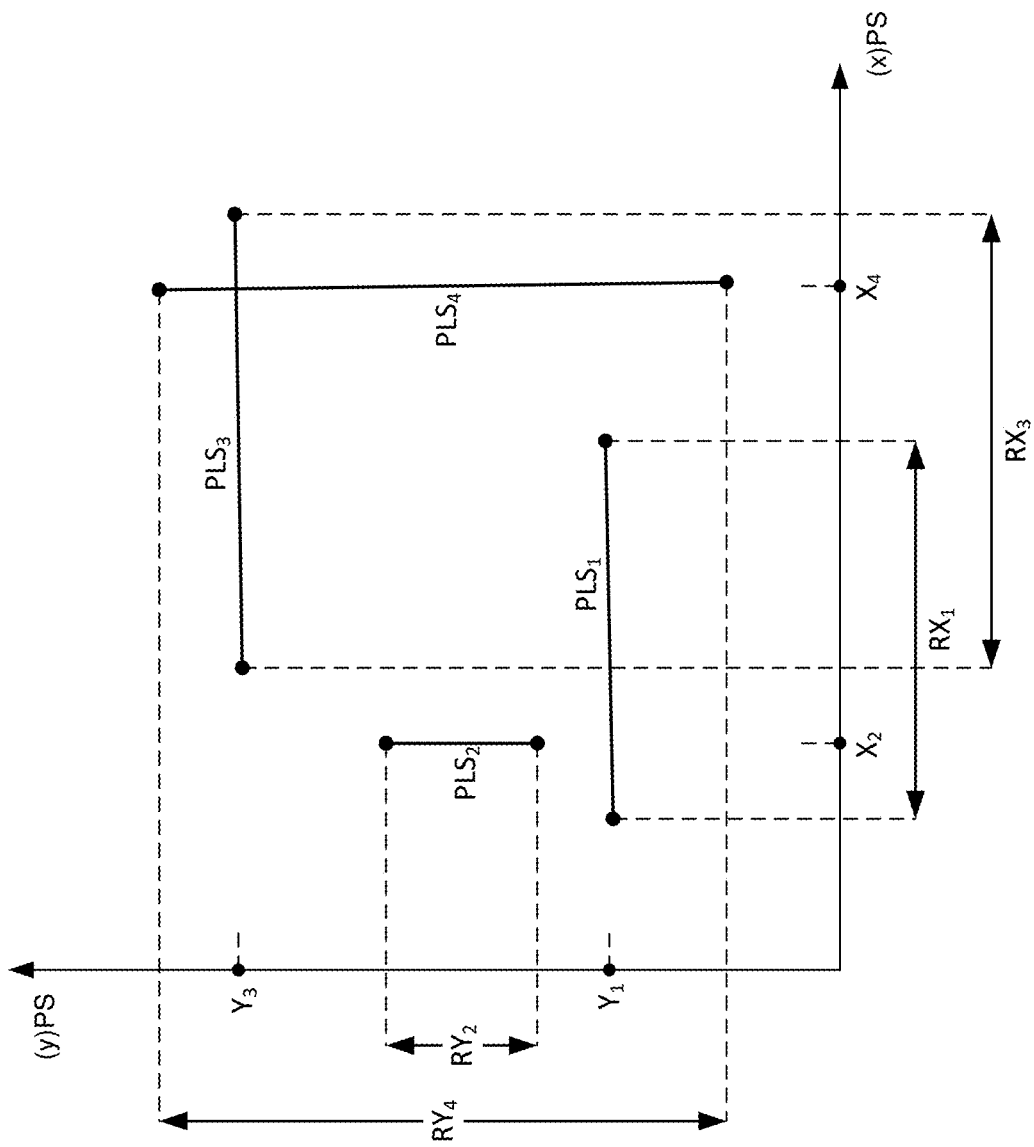
FIG. 12A illustrates exemplary detailed operations for selecting a subset of projected line segments, in accordance with some embodiments.

Referring to FIG. 8, in some embodiments, operation 820 of selecting a subset of projected line segments from the set of projected line segments includes selecting a subset of four projected line segments including two first projected line segments and two second projected line segments, as illustrated in FIG. 12A, for example. Then, operation 830 of determining, based on the sets of projection parameters of the subset of projected line segments, whether the subset of projected line segments satisfies the predefined shape criterion involves determining whether the subset of four projected line segments satisfies a rectangle criterion, as illustrated in FIG. 12B, for example.

In some embodiments, as illustrated in FIG. 12A, the selected subset of four projected line segments includes two first projected line segments (PLS1 and PLS3) represented by sets of projection parameters $(RX_1, Y_1)$ and $(RX_3, Y_3)$ and two second projected line segments (PLS2 and PLS4) represented by sets of projection parameters $(RY_2, X_2)$ and $(RY_4, X_4)$, where the projection parameters $Xi$ and $Yi$ correspond to line position parameters and the projection parameters $RXi$ and $RYi$ correspond to segment range parameters, as described previously.

In some embodiments, as illustrated in FIG. 12B, determining whether the subset of four projected line segments satisfies the rectangle criterion includes determining whether both of the following conditions are satisfied:

First condition: The interval $[X_2, X_4]$ defined by the line positions $X2$ and $X4$ of the pair of second projected line segments PLS2 and PLS4 overlaps with the segment range $(RX1, RX3)$ of each of the first line segments PLS1 and PLS3 by an amount larger than or equal to a predefined minimum coverage $C_{min}$:

$|[X_2,X_4] \cap RX_1| \geq C_{min}$ and $|[X_2,X_4] \cap RX_3| \geq C_{min}$

Second condition: The interval $[Y_1, Y_3]$ defined by the line positions $Y1$ and $Y3$ of the pair of first projected line segments PLS1 and PLS3 overlaps with the segment range $(RY2, RY4)$ of each of the second projected line segments PLS2 and PLS4 by an amount larger than or equal to a predefined minimum coverage $C_{min}$:

$|[Y_1,Y_3] \cap RY_2| \geq C_{min}$ and $|[Y_1,Y_3] \cap RY_4| \geq C_{min}$

This rectangle criterion allows a rectangle to be detected even though portions of the sides or the corners of the rectangle are occluded. In other embodiments, different rectangle criteria may be used.

In some embodiments, the operations for detecting an object in an image described above with reference to FIG. 5 and FIG. 9 are used to detect a rectangle.

Figure 13A:
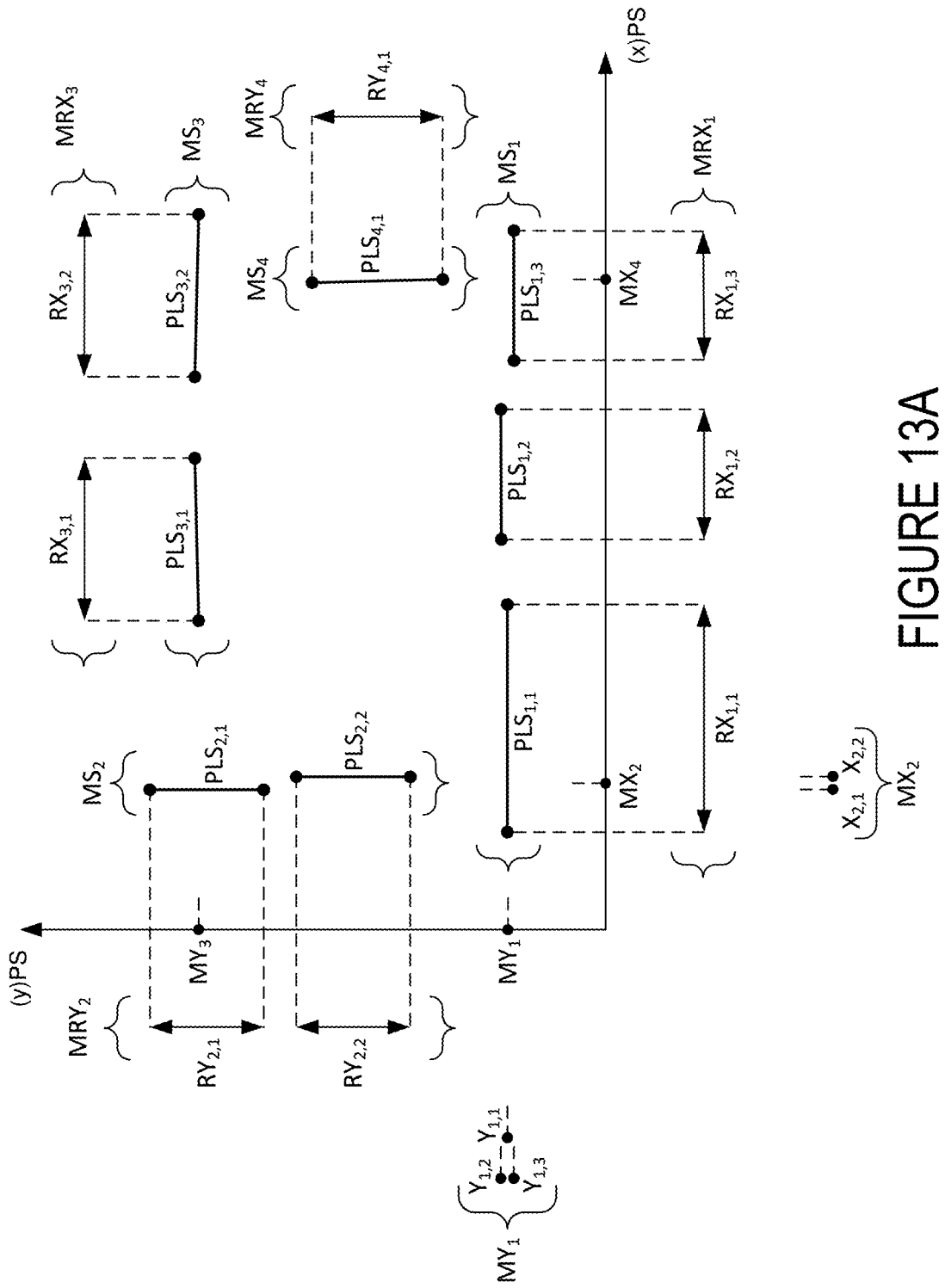
FIG. 13A illustrates exemplary detailed operations for selecting a subset of macro projected line segments, in accordance with some embodiments.
Figure 13B:
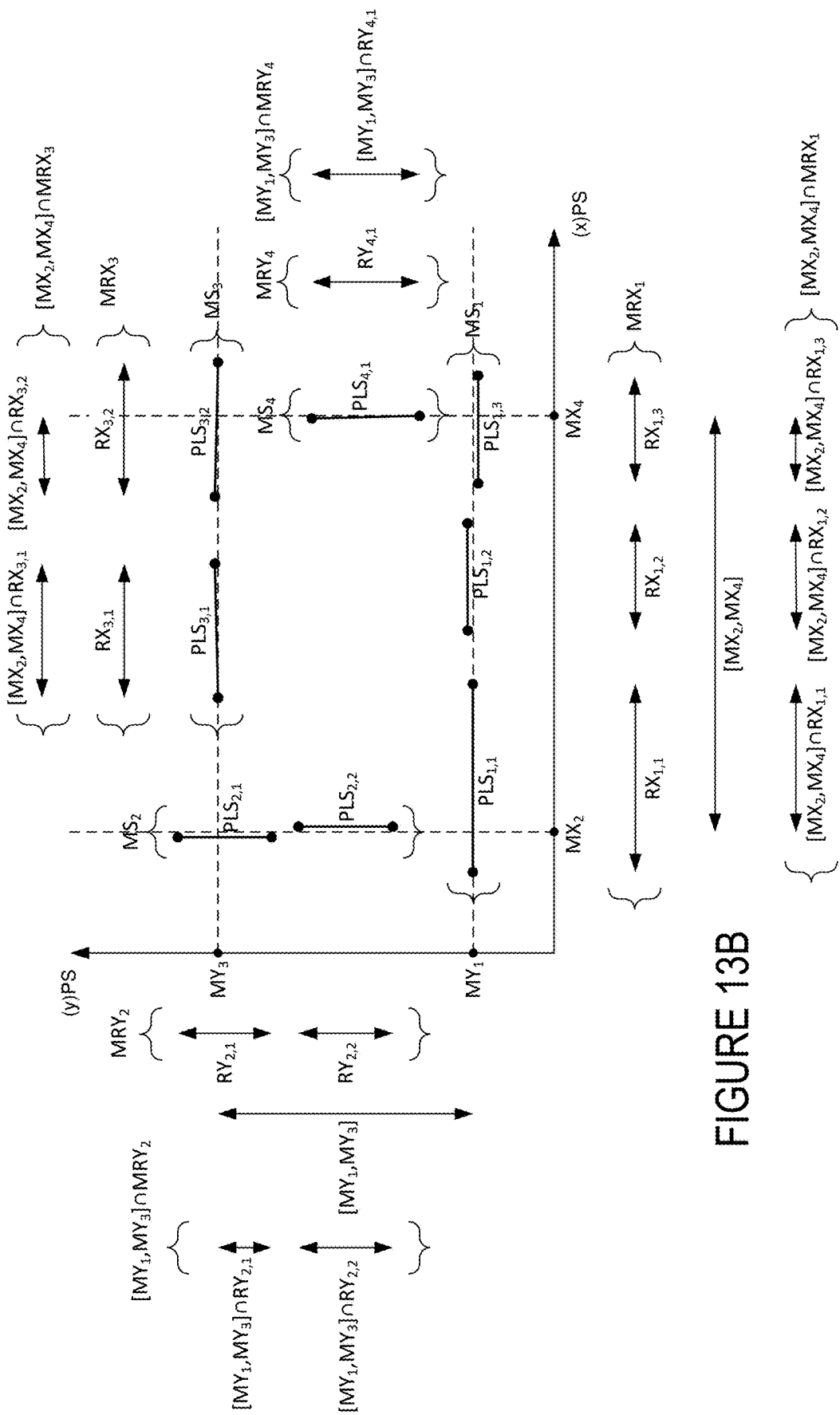
FIG. 13B illustrates exemplary detailed operations for determining whether the subset of macro projected line segments of FIG. 13A satisfies a predefined shape criterion, in accordance with some embodiments.

Referring to FIG. 9, in some embodiments, operation 920 of selecting a subset of macro projected line segments from the set of macro projected line segments includes selecting a subset of four macro projected line segments including two first macro projected line segments and two second macro projected line segments, as illustrated in FIG. 13A, for example. Then operation 930 of determining, based on the macro sets of projection parameters of the subset of macro projected line segments, whether the subset of macro projected line segments satisfies the predefined shape criterion involves determining whether the subset of four macro projected line segments satisfies a rectangle criterion, as illustrated in FIG. 13B, for example.

In some embodiments, as illustrated in FIG. 13A, the selected subset of four macro projected line segments includes two first macro projected line segments (MS1 and MS3) represented by macro sets of projection parameters $(MRX_1, MY_1)$ and $(MRX_3, MY_3)$ and two second macro projected line segments (MS2 and MS4) represented by macro sets of projection parameters $(MRY_2, MX_2)$ and $(MRY_4, MX_4)$.

As illustrated, each macro projected line segment is composed of a group of one or more collinear projected line segments. Each first macro projected line segment is composed of a group of one or more collinear first projected line segments. For example, the first macro projected line segment MS1 is composed of the group of three collinear first projected line segments $PLS_{1,1}$, $PLS_{1,2}$ and $PLS_{1,3}$. Each second macro projected line segment is composed of a group of one or more collinear second projected line segments. For example, the second macro projected line segment MS2 is composed of the group of two collinear second projected line segments $PLS_{2,1}$ and $PLS_{2,2}$.

Further, each macro projected line segment is associated with a macro set of projection parameters determined from the sets of projection parameters of the group of projected line segments composing the respective macro projected line segment. For example, the first macro projected line segment MS1 is represented by the macro set of projection parameters $(MRX_1, MY_1)$ determined from the sets of projection parameters $(RX_{1,1}, Y_{1,1})$, $(RX_{1,2}, Y_{1,2})$ and $(RX_{1,3}, Y_{1,3})$ of the first projected line segments $PLS_{1,1}$, $PLS_{1,2}$ and $PLS_{1,3}$ composing the first macro projected line segment MS1.

In some embodiments, as illustrated, the macro set of projection parameters associated with a macro projected line segment includes a macro line position parameter and a macro segment range parameter. The macro line position parameter is determined from the line position parameters of the group of projected line segments composing the respective macro projected line segment. The macro segment range parameter is determined from the segment range parameters of the group of projected line segments composing the respective macro projected line segment. In some embodiments, the macro segment range parameter may be determined as a union of the segment range parameters of the group of projected line segments composing the respective macro projected line segment. For example, the macro set of projection parameters $(MRX_1, MY_1)$ associated with the first macro projected line segment MS1 includes a macro line position parameter MY1 and a macro segment range parameter MRX1. As shown, the macro line position parameter MY1 is determined from the line position parameters $Y_{1,1}$, $Y_{1,2}$ and $Y_{1,3}$ of the first projected line segments $PLS_{1,1}$, $PLS_{1,2}$ and $PLS_{1,3}$ composing the first macro projected line segment MS1. As shown, the macro segment range parameter MRX1 is determined from the segment range parameters $RX_{1,1}$, $RX_{1,2}$ and $RX_{1,3}$ of the first projected line segments $PLS_{1,1}$, $PLS_{1,2}$ and $PLS_{1,3}$ composing the first macro projected line segment MS1.

In some embodiments, as illustrated in FIG. 13B, determining whether the subset of four macro projected line segments satisfies the rectangle criterion includes determining whether both of the following conditions are satisfied:

First condition: The interval $[MX_2, MX_4]$ defined by the macro line positions MX2 and MX4 of the pair of second macro projected line segments MS2 and MS4 overlaps with the macro segment range (MRX1, MRX3) of each of the first macro line segments MS1 and MS3 by an amount larger than or equal to a predefined minimum coverage $C_{min}$:

$|[MX_2, MX_4] \cap MRX_1| \geq C_{min}$ and $|[MX_2, MX_4] \cap MRX_3| \geq C_{min}$ where $MRX_i = \cup_{k=1}^{K_i} RX_{i,k}$ where Ki is the number of projected line segments in the macro projected line segment MSi. In the case where the macro segment range parameter is determined as a union of the segment range parameters of the projected line segments composing the macro projected line segment, the overlap or intersection between the interval defined by the line positions and the macro segment range parameter may correspond to the union of the intersections of the interval with each of the segment range parameters of the projected line segments composing the macro projected line segment.

Second condition: The interval $[MY_1, MY_3]$ defined by the macro line positions MY1 and MY3 of the pair of first macro projected line segments MS1 and MS3 overlaps with the macro segment range (MRY2, MRY4) of each of the second macro projected line segments MS2 and MS4 by an amount larger than or equal to a predefined minimum coverage $C_{min}$:

$|[MY_1, MY_3] \cap MRY_2| \geq C_{min}$ and $|[MY_1, MY_3] \cap MRY_4| \geq C_{min}$ where $MRY_i = \cup_{k=1}^{K_i} RY_{i,k}$ where Ki is the number of projected line segments in the macro projected line segment MSi.

This rectangle criterion allows a rectangle to be detected even though portions of the sides or the corners of the rectangle are occluded. In other embodiments, different rectangle criteria may be used.

In some embodiments, the operations for detecting an object in an image described above with reference to FIG. 3 and FIG. 6 are used to detect a line or line segment.

Figure 14:
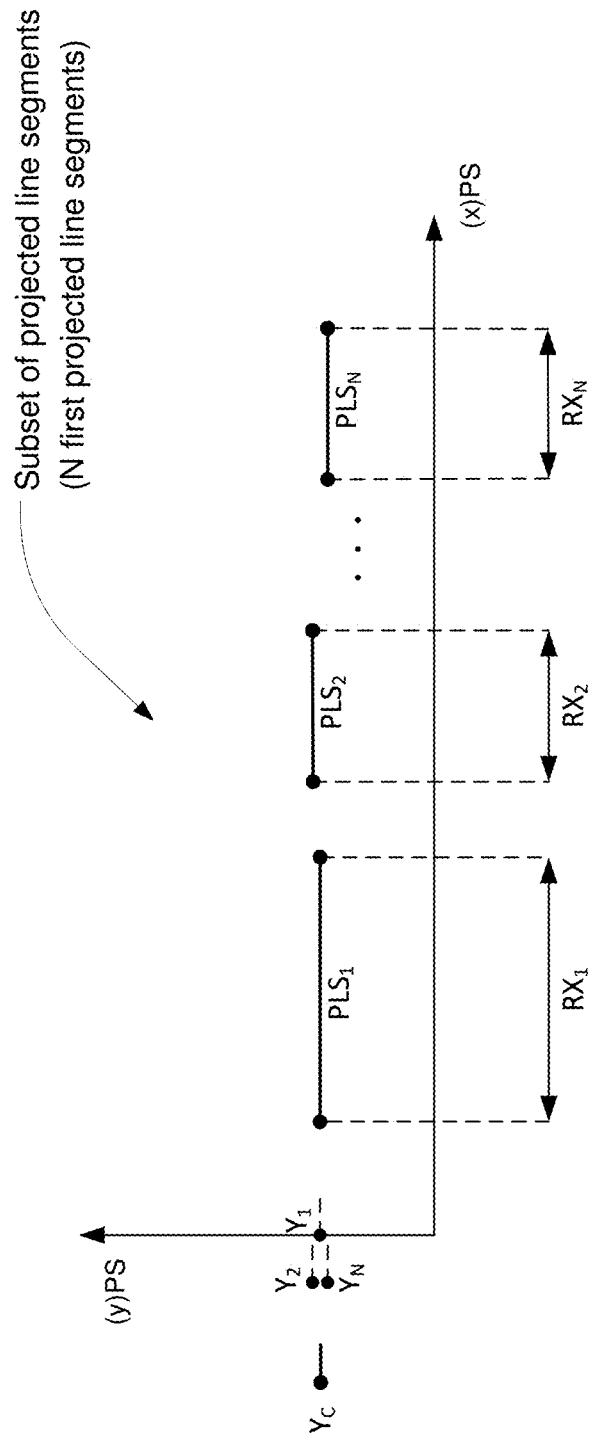
FIG. 14 illustrates exemplary detailed operations for selecting a subset of projected line segments and determining whether the subset of projected line segments satisfies a predefined shape criterion, in accordance with some embodiments.

Referring to FIG. 6 and FIG. 14, in some embodiments, operation 620 of selecting a subset of projected line segments from the set of projected line segments includes selecting a subset of N first projected line segments, where N is larger than or equal to two. Then operation 630 of determining, based on the sets of projection parameters of the subset of projected line segments, whether the subset of projected line segments satisfies the predefined shape criterion involves determining whether the subset of N first projected line segments satisfies a line segment criterion.

In some embodiments, as illustrated in FIG. 14, the selected subset of N first projected line segments PLSi are represented by projection parameters (RXi, Yi) for i=1, 2, ... N, where RXi and Yi correspond to the segment range and line position parameters of a first projected line segment PLSi, as described previously.

In some embodiments, the selected subset of N first projected line segments satisfies the line segment criterion if the following conditions are satisfied:

First condition: The line position Yi of each projected line segment PLSi (of the subset of N first projected line segments) is within a predefined tolerance value T of a center line position Yc:

$$D(Y_i, Y_c) < T \text{ for } i=1, 2, \ldots N$$

In one example, the center line position Yc corresponds to an average or weighted average of the line positions Yi of the subset of N first projected line segments PLSi, where in the case of a weighted average, the line position Yi of each projected line segment PLSi may be weighted by the length of the segment range RXi of the respective projected line segment:

$$Y_c = \frac{1}{N} \sum_{i=1}^{i=N} Y_i$$

$$Y_c = \frac{\sum_{i=1}^{i=N} Y_i |RX_i|}{\sum_{i=1}^{i=N} |RX_i|}$$

In another example, the center line position Yc may correspond to the peak of a cluster of line positions of projected line segments (e.g., corresponding to a larger number of projected line segments than the subset of N projected line segments).

Second condition: There is no overlap between the segment ranges RXi of the projected line segments PLSi composing the set of N first projected line segments:

$$RX_i \cap RX_j = \emptyset \text{ if } i \neq j$$

In some embodiments, the second condition is optional.

In some embodiments, other line segment criterions may be applied.

In some embodiments, the operations for detecting an object in an image described above with reference to FIG. 3 and FIG. 6 are used to detect a stripe pattern.

Figure 15:
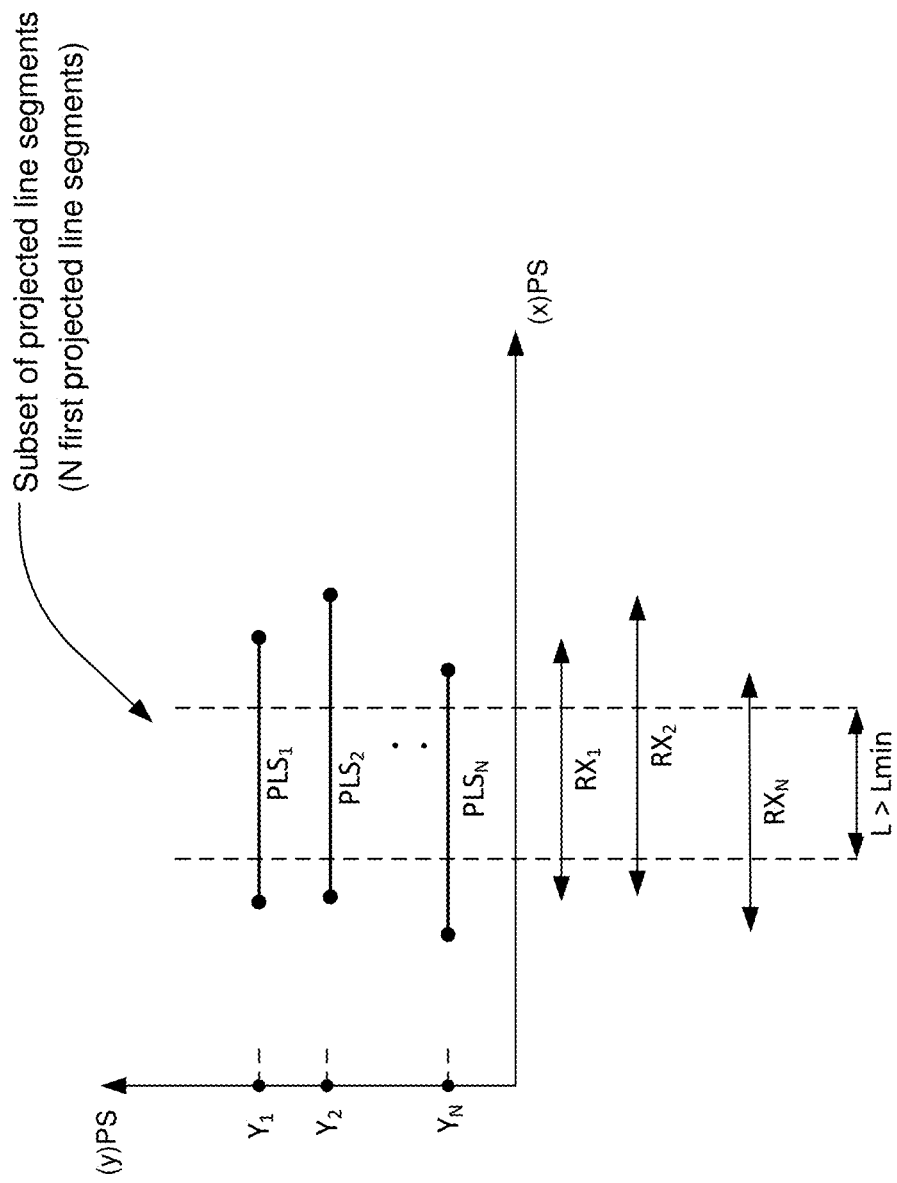
FIG. 15 illustrates exemplary detailed operations for selecting a subset of projected line segments and determining whether the subset of projected line segments satisfies a predefined shape criterion, in accordance with some embodiments.

Referring to FIG. 6 and FIG. 15, in some embodiments, operation 620 of selecting a subset of projected line segments from the set of projected line segments includes selecting a subset of N first projected line segments, where N is larger than or equal to two. Then operation 630 of determining, based on the sets of projection parameters of the subset of projected line segments, whether the subset of projected line segments satisfies the predefined shape criterion involves determining whether the subset of N first projected line segments satisfies a stripe pattern criterion.

In some embodiments, as illustrated in FIG. 15, each of the first projected line segments PLSi is represented by a set of projection parameters (RXi, Yi), where RXi and Yi correspond to the segment range and line position of the first projected line segment PLSi, as described previously.

In some embodiments, the selected subset of N first projected line segments satisfies the stripe pattern criterion if the following condition is satisfied:

There exists an interval L having a length greater than a predefined minimum stripe length Lmin that is within the segment range RXi of each of the first projected line segments PLSi of the selected subset of N projected line segments:

$$RX_i \cap L = L \text{ for } i=1, \ldots N$$

$$|L| > L_{min}$$

Other stripe pattern criteria may be used.

In some embodiments, the operations for detecting an object in an image described above with reference to FIG. 3 and FIG. 7 are used to detect a stripe pattern.

Figure 16:
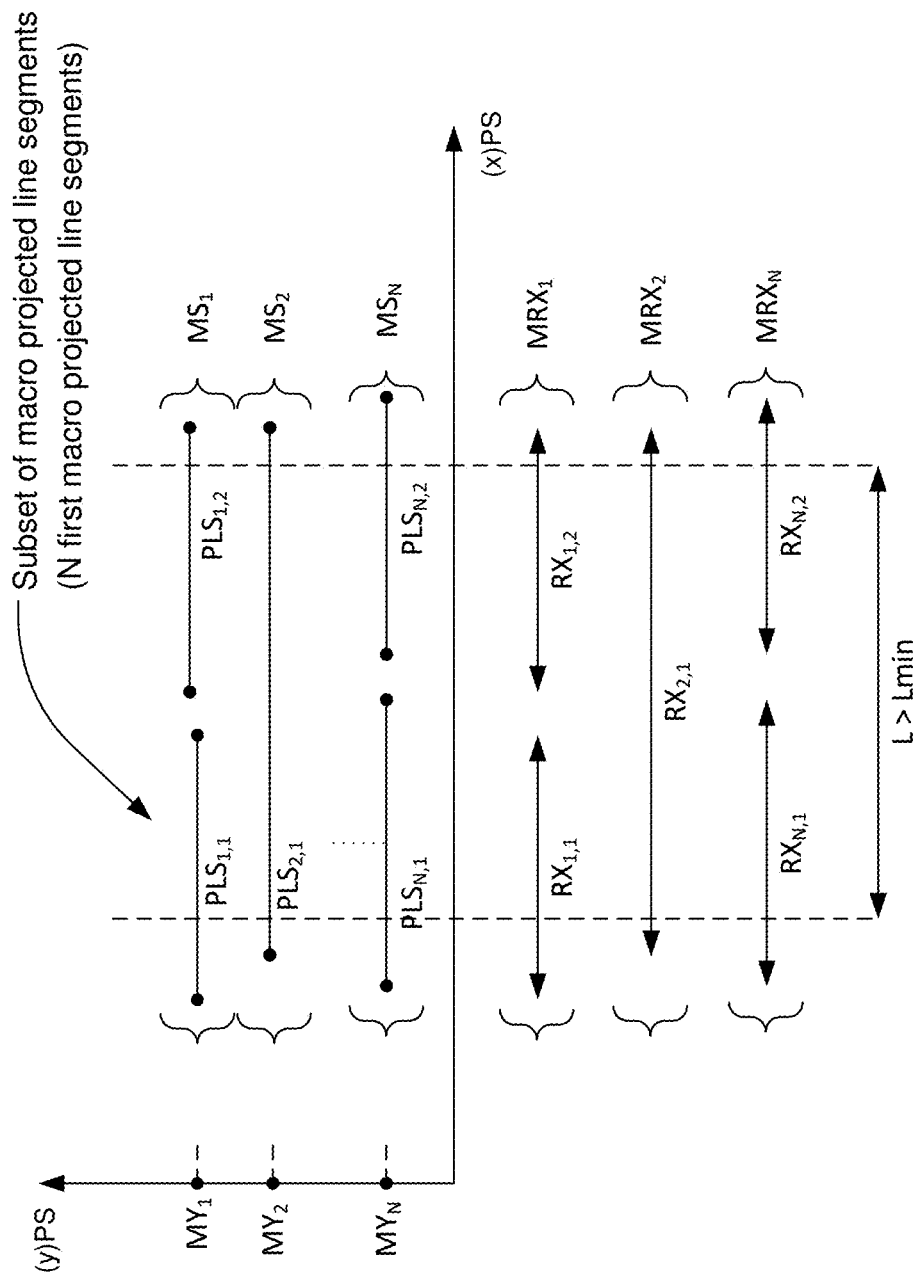
FIG. 16 illustrates exemplary detailed operations for selecting a subset of macro projected line segments and determining whether the subset of macro projected line segments satisfies a predefined shape criterion, in accordance with some embodiments.

Referring to FIG. 7 and FIG. 16, in some embodiments, operation 720 of selecting a subset of macro projected line segments from the set of macro projected line segments includes selecting a subset of N first macro projected line segments, where N is larger than or equal to two. Then operation 730 of determining, based on the macro sets of projection parameters of the subset of macro projected line segments, whether the subset of macro projected line segments satisfies the predefined shape criterion involves determining whether the subset of N first macro projected line segments satisfies a stripe pattern criterion.

In some embodiments, as illustrated in FIG. 16, each of the first macro projected line segments MSi is represented by a macro set of projection parameters (MRXi, MYi), where MRXi and MYi correspond to the macro segment range and macro line position of the first macro projected line segment MSi, as described previously. As discussed previously, the macro line position parameter MYi may be determined from the line position parameters of the first projected line segments composing the first macro projected line segment MSi and the macro segment range parameter MRXi may be determined from the segment range parameters of the first projected line segments composing the first macro projected line segment MS1.

In some embodiments, the selected subset of N first macro projected line segments satisfies the stripe pattern criterion if the following condition is satisfied:

There exists an interval L having a length greater than a predefined minimum stripe length Lmin for which, for each of the first macro projected line segments MSi of the selected subset of N first macro projected line segments, the interval L is within the macro segment range MRXi of the first macro projected line segments MSi and the length of the overlap between the interval L and the macro segment range MRXi is larger than a predefined minimum coverage Cmin:

$$|MRX_i \cap L| > C_{min} \text{ for } i=1, \ldots N$$

$$|L| > L_{min}$$

In the case where the macro segment range parameter MRXi of a macro projected line segment MSi is determined as a union of the segment range parameters RXi,k of the projected line segments PLSi,k composing the macro projected line segment, the overlap or intersection between the interval L and the macro segment range parameter MRXi may correspond to the union of the intersections of the interval L with each of the segment range parameters RXi,k of the projected line segments PLSi,k composing the macro projected line segment MSi.

Other stripe pattern criteria may be used.

In some embodiments, the operations for detecting an object in an image described above with reference to FIG. 5 and FIG. 8 are used to detect a corner.

Figure 17:
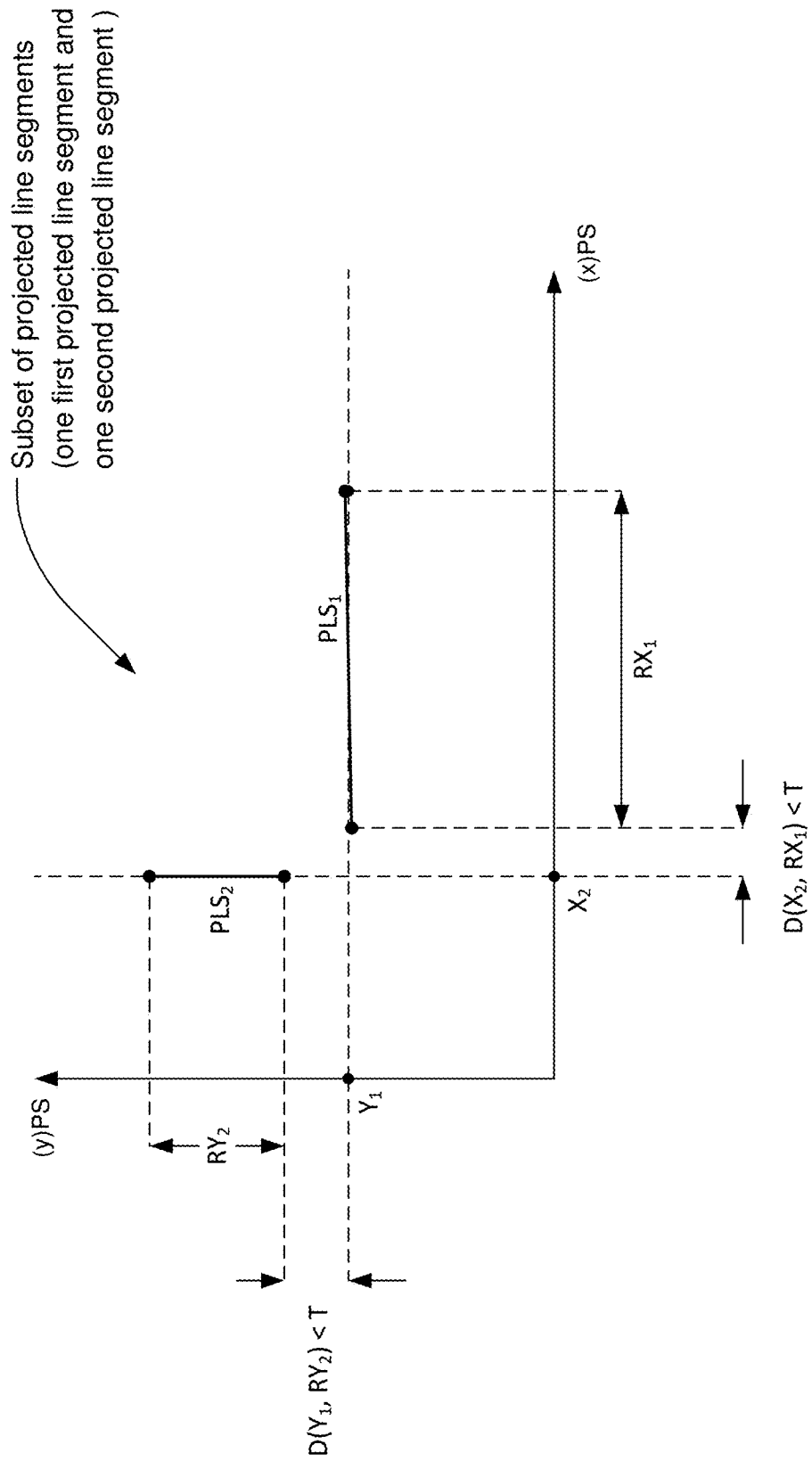
FIG. 17 illustrates exemplary detailed operations for selecting a subset of projected line segments and determining whether the subset of projected line segments satisfies a predefined shape criterion, in accordance with some embodiments.

Referring to FIG. 8 and FIG. 17, in some embodiments, operation 820 of selecting a subset of projected line segments from the set of projected line segments includes selecting a subset of two projected line segments including one first projected line segment and one second projected line segment. Then, operation 830 of determining, based on the sets of projection parameters of the subset of projected line segments, whether the subset of projected line segments satisfies the predefined shape criterion involves determining whether the subset of two projected line segments satisfies a corner criterion.

In some embodiments, as illustrated in FIG. 17, the selected subset of two projected line segments includes one first projected line segment (PLS1) represented by a set of projection parameters ($RX_1$, $Y_1$) and one second projected line segment (PLS2) represented by a set of projection parameters ($RY_2$, $X_2$), where the projection parameters X2 and Y1 correspond to line position parameters and the projection parameters RX1 and RY2 correspond to segment range parameters, as described previously.

In some embodiments, determining whether the subset of two projected line segments satisfies the corner criterion includes determining whether both of the following conditions are satisfied:

In the direction of the x axis of the projection space, the shortest distance between the line position (X2) of the second projected line segment (PLS2) and the segment range (RX1) of the first projected line segment (PLS1) (i.e., a point belonging to the segment range) is smaller than a tolerance value T:

$$D(X2,RX1)<T$$

In other words, in the direction of the x axis of the projection space, the line position (X2) of the second projected line segment (PLS2) is within the segment range (RX1) or within a tolerance value T of one of the boundaries of the segment range (RX1) of the first projected line segment (PLS1).

In the direction of the y axis of the projection space, the shortest distance between the line position (Y1) of the first projected line segment (PLS1) and the segment range (RY2) of the second projected line segment (PLS2) (i.e., a point belonging to the segment range) is smaller than a tolerance value T:

$$D(Y1,RY2)<T$$

In other words, in the direction of the y axis of the projection space, the line position (Y1) of the first projected line segment (PLS1) is within the segment range (RY2) or within a tolerance value T of one of the boundaries of the segment range (RY2) of the second projected line segment (PLS2).

This corner criterion allows a corner to be detected in cases where the meeting point of the two line segments forming the corner is occluded or where the line segments forming the corner extend beyond their intersection point. In other embodiments, different corner criteria may be used.

In some embodiments, the operations for detecting an object in an image described above with reference to FIG. 5 and FIG. 9 are used to detect a corner.

Figure 18:
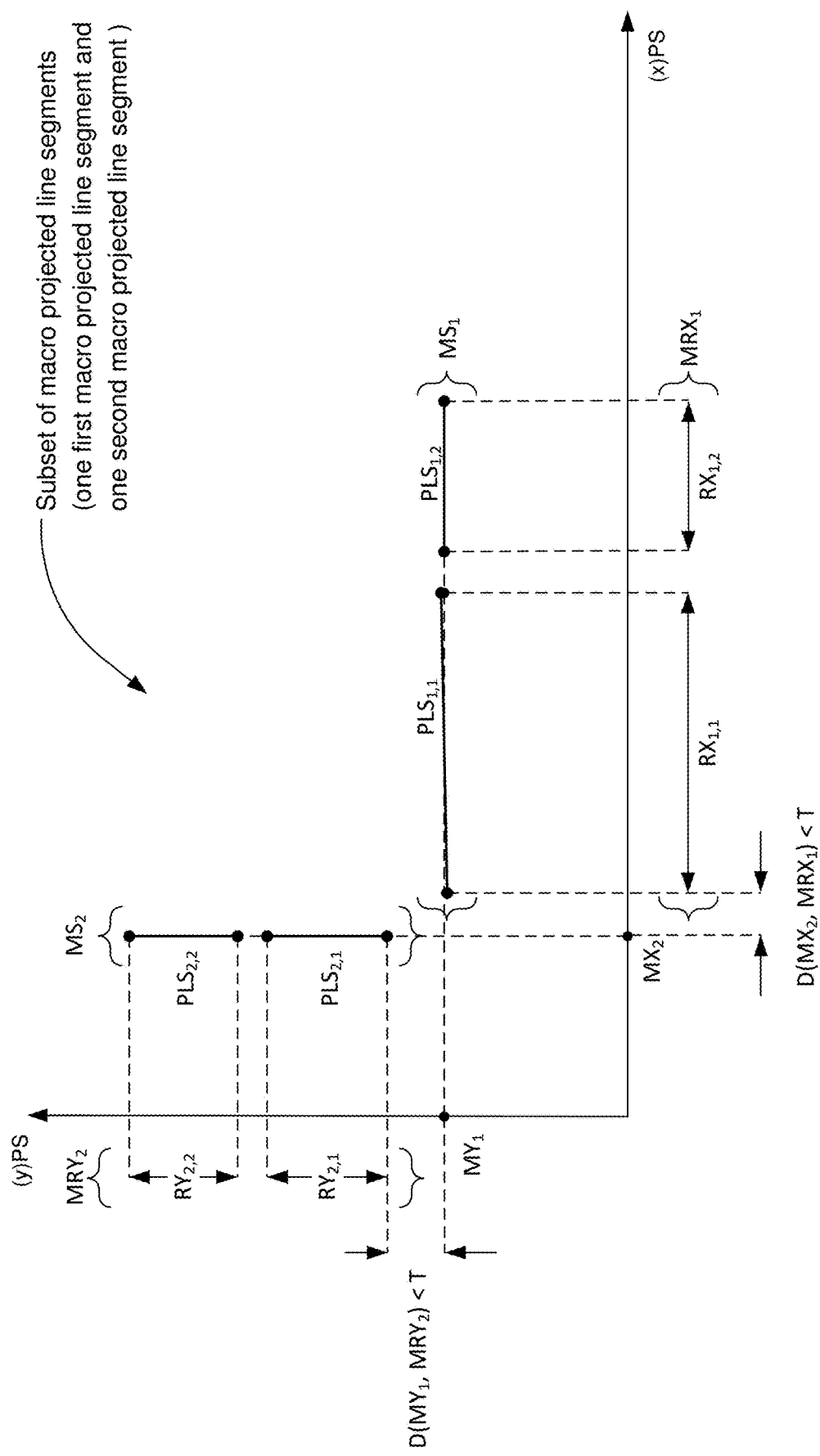
FIG. 18 illustrates exemplary detailed operations for selecting a subset of macro projected line segments and determining whether the subset of macro projected line segments satisfies a predefined shape criterion, in accordance with some embodiments.

Referring to FIG. 9 and FIG. 18, in some embodiments, operation 920 of selecting a subset of macro projected line segments from the set of macro projected line segments includes selecting a subset of two macro projected line segments including one first macro projected line segment and one second macro projected line segment. Then operation 930 of determining, based on the macro sets of projection parameters of the subset of macro projected line segments, whether the subset of macro projected line segments satisfies the predefined shape criterion involves determining whether the subset of two macro projected line segments satisfies a corner criterion.

In some embodiments, as illustrated in FIG. 18, the selected subset of two macro projected line segments includes one first macro projected line segment (MS1) represented by a macro set of projection parameters ($MRX_1$, $MY_1$) and one second macro projected line segment (MS2) represented by a macro set of projection parameters ($MRY_2$, $MX_2$), where the projection parameters MX2 and MY1 correspond to macro line position parameters and the projection parameters MRX1 and MRY2 correspond to macro segment range parameters, as described previously.

In some embodiments, determining whether the subset of two macro projected line segments satisfies the corner criterion includes determining whether both of the following conditions are satisfied:

In the direction of the x axis of the projection space, the shortest distance between the macro line position (MX2) of the second macro projected line segment (MS2) and the macro segment range (MRX1) of the first macro projected line segment (MS1) (i.e., a point belonging to the segment range) is smaller than a tolerance value T:

$$D(MX2,MRX1)<T$$

In other words, in the direction of the x axis of the projection space, the macro line position (MX2) of the second macro projected line segment (MS2) is within the segment range (MRX1) or within a tolerance value T of one of the outer boundaries of the macro segment range (MRX1) of the first macro projected line segment (MS1).

In the direction of the y axis of the projection space, the shortest distance between the macro line position (MY1) of the first macro projected line segment (MS1) and the segment range (MRY2) of the second macro projected line segment (MS2) (i.e., a point belonging to the segment range) is smaller than a tolerance value T:

$$D(MY1,MRY2)<T$$

In other words, in the direction of the y axis of the projection space, the macro line position (MY1) of the first macro projected line segment (MS1) is within the macro segment range (MRY2) or within a tolerance value T of one of the outer boundaries of the macro segment range (MRY2) of the second macro projected line segment (MS2).

This corner criterion allows a corner to be detected in cases where the meeting point of the two line segments forming the corner is occluded or where the line segments forming the corner extend beyond their intersection point. In other embodiments, different corner criteria may be used.

In some embodiments, the operations for detecting an object in an image described above with reference to FIG. 5 and FIG. 8 are used to detect a grid pattern.

Figure 19:
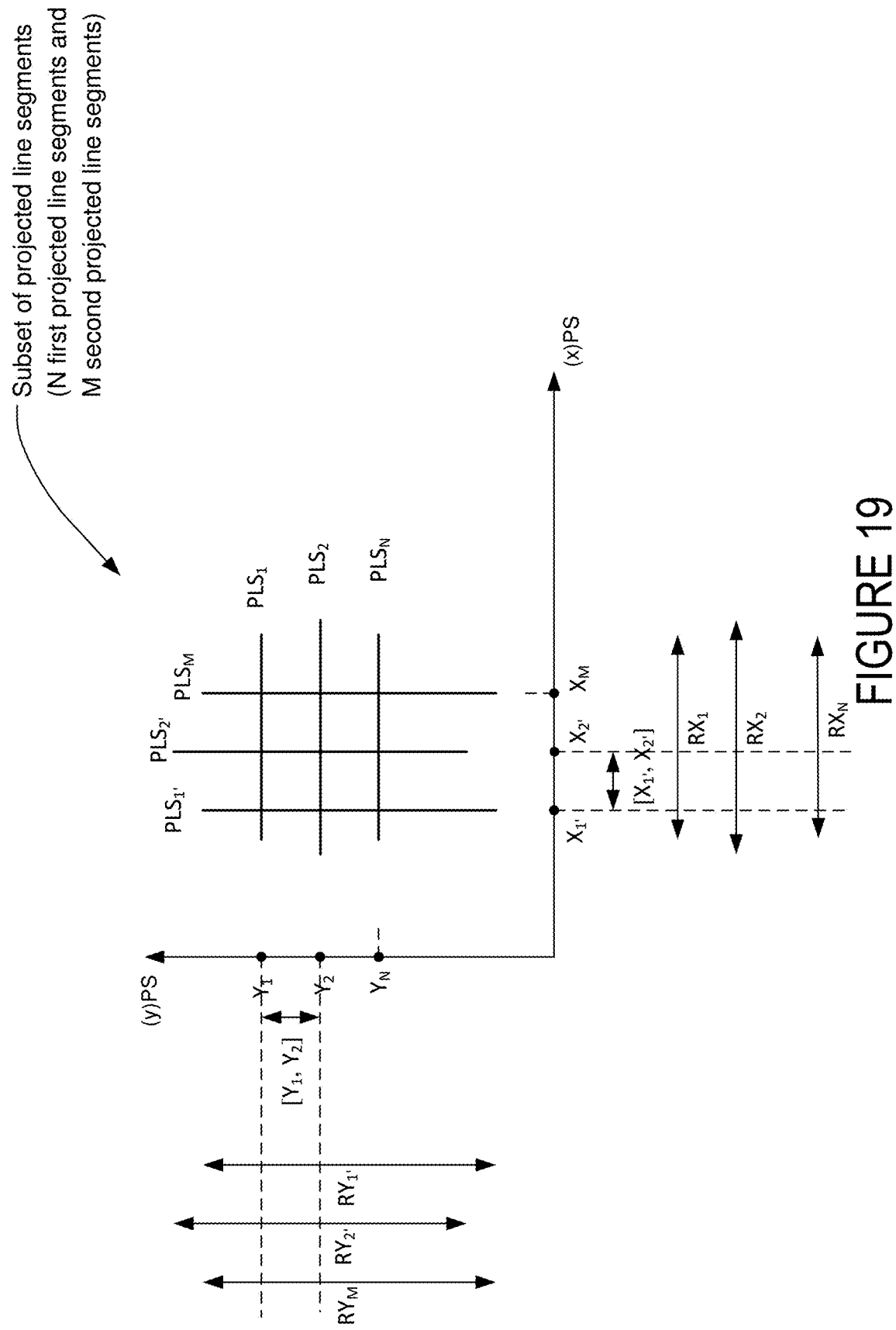
FIG. 19 illustrates exemplary detailed operations for selecting a subset of projected line segments and determining whether the subset of projected line segments satisfies a predefined shape criterion, in accordance with some embodiments.

Referring to FIG. 8 and FIG. 19, in some embodiments, operation 820 of selecting a subset of projected line segments from the set of projected line segments includes selecting a subset of (N+M) projected line segments including N first projected line segments and M second projected line segments, where both N and M are larger than or equal to two and (N+M) is larger than four, in one example. Then, operation 830 of determining, based on the sets of projection parameters of the subset of projected line segments, whether the subset of projected line segments satisfies the predefined shape criterion involves determining whether the subset of (N+M) projected line segments satisfies a grid pattern criterion.

In some embodiments, as illustrated in FIG. 19, each of the first projected line segments PLSi is represented by a set of projection parameters (RXi, Yi), where RXi and Yi correspond to the segment range and line position of the first projected line segment PLSi, and each of the second projected line segments PLSi' is represented by a set of projection parameters (RYi', Xi'), where RYi' and Xi' correspond to the segment range and line position of the second projected line segment PLSi', as described previously.

In some embodiments, the selected subset of (N+M) projected line segments satisfies the grid pattern criterion if the following conditions are satisfied:

First condition: For each pair of consecutive second projected line segments (PLSj, PLS$_{j+1}$) there is an overlap between the interval [Xj, X$_{j+1}$] defined by the line positions Xj and X$_{j+1}$ of the pair of second projected line segments and the segment range RXi of each of the first projected line segments PLSi and the length of the overlap is above a predefined minimum coverage C$_{min}$:

$$|[X_j, X_{j+1}] \cap RX_i| \geq C_{min} \text{ for } j=1, \ldots M-1 \text{ and } i=1, \ldots N$$

Second condition: For each pair of consecutive first projected line segments (PLSi, PLS$_{i+1}$) there is an overlap between the interval [Yi, Y$_{i+1}$] defined by the line positions Yi and Y$_{i+1}$ of the pair of first projected line segments and the segment range RYj of each of the second projected line segments PLSj and the length of the overlap is above a predefined minimum coverage Cmin:

$$|[Y_i, Y_{i+1}] \cap RY_j| \geq C_{min} \text{ for } i=1, \ldots N-1 \text{ and } j=1, \ldots M$$

Other grid pattern criteria may be used.

In some embodiments, the operations for detecting an object in an image described above with reference to FIG. 5 and FIG. 9 are used to detect a grid pattern.

Figure 20:
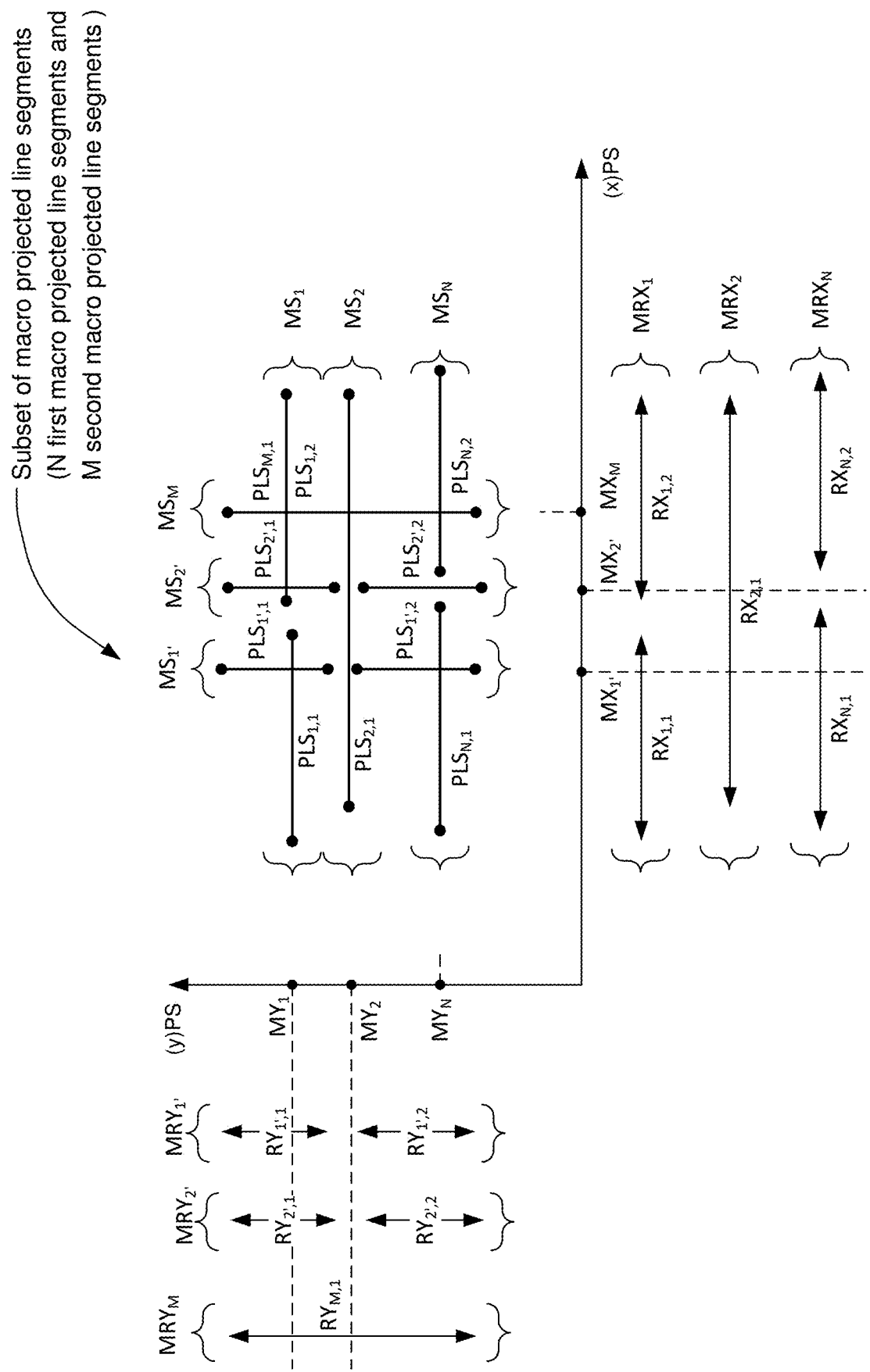
FIG. 20 illustrates exemplary detailed operations for selecting a subset of macro projected line segments and determining whether the subset of macro projected line segments satisfies a predefined shape criterion, in accordance with some embodiments.

Referring to FIG. 9 and FIG. 20, in some embodiments, operation 920 of selecting a subset of macro projected line segments from the set of macro projected line segments includes selecting a subset of (N+M) macro projected line segments including N first macro projected line segments and M second macro projected line segments, where both N and M are larger than or equal to two and (N+M) is larger than four, in one example. Then operation 930 of determining, based on the macro sets of projection parameters of the subset of macro projected line segments, whether the subset of macro projected line segments satisfies the predefined shape criterion involves determining whether the subset of (N+M) macro projected line segments satisfies a grid pattern criterion.

In some embodiments, as illustrated in FIG. 20, each of the first macro projected line segments MSi is represented by a macro set of projection parameters (MRXi, MYi), where MRXi and MYi correspond to the macro segment range and macro line position of the first macro projected line segment MSi, and each of the second macro projected line segments MSi' is represented by a macro set of projection parameters (MRYi', MXi'), where MRYi' and MXi' correspond to the macro segment range and macro line position of the second macro projected line segment MSi', as described previously.

In some embodiments, the selected subset of (N+M) macro projected line segments satisfies the grid pattern criterion if the following conditions are satisfied:

First condition: For each pair of consecutive second macro projected line segments (MSj, MS$_{j+1}$) there is an overlap between the interval [MXj, MX$_{j+1}$] defined by the macro line positions MXj and MX$_{j+1}$ of the pair of second macro projected line segments and the macro segment range MRXi of each of the first macro projected line segments MSi and the length of the overlap is above a predefined minimum coverage Cmin:

$$|[MX_j, MX_{j+1}] \cap MRX_i| \geq C_{min} \text{ for } j=1, \ldots M-1 \text{ and } i=1, \ldots N$$

Second condition: For each pair of consecutive first macro projected line segments (MSi, MS$_{i+1}$) there is an overlap between the interval [MYi, MY$_{i+1}$] defined by the macro line positions MYi and MY$_{i+1}$ of the pair of first macro projected line segments and the macro segment range MRYj of each of the second macro projected line segments MSj and the length of the overlap is above a predefined minimum coverage Cmin:

$$|[MY_i, MY_{i+1}] \cap MRY_j| \geq C_{min} \text{ for } i=1, \ldots N-1 \text{ and } j=1, \ldots M$$

Other grid pattern criteria may be used.

Methods and systems have been proposed to detect an object composed of line segments generally oriented in a first direction (in some embodiments) and to detect an object composed of line segments generally oriented in a first direction and in a second direction perpendicular to the first direction (in other embodiments).

The methods described herein identify (isolate), from all line segments detected in the image, the line segments that are at a desired orientation and project these line segments to a projection space oriented at the desired orientation to obtain projected line segments. Object detection for the desired orientation continues in the projection space where, firstly, all the projected line segments have the desired orientation and, secondly, the projected line segments are all oriented generally parallel to one of the axes of the projection space. This simplifies the complexity of the analysis by reducing the number of line segments that need to be processed and further simplifies the comparison of line segments for collinearity and alignment or overlapping, reducing the amount of computer resources required. For example, in the projection space, the collinearity of two line segments can be determined directly as the difference of their line position parameters and the alignment or overlapping of two line segments can be determined directly by comparing their segment range parameters. The methods are particularly advantageous for images containing a large amount of line features at different orientations, where existing methods may fail.

Some embodiments have employed shape criteria that are invariant to scale allowing the detection of instances of the object at different scales without repeating the analysis for different scale factors, as required by some existing methods. Further, in some embodiments, the method can detect objects at multiple unknown orientations by repeating the process for multiple desired orientations. Finally, some embodiments employ a tolerance value that can be selected to allow a desired degree of tolerance of parallelism and orthogonality.

Architecture

Figure 21:
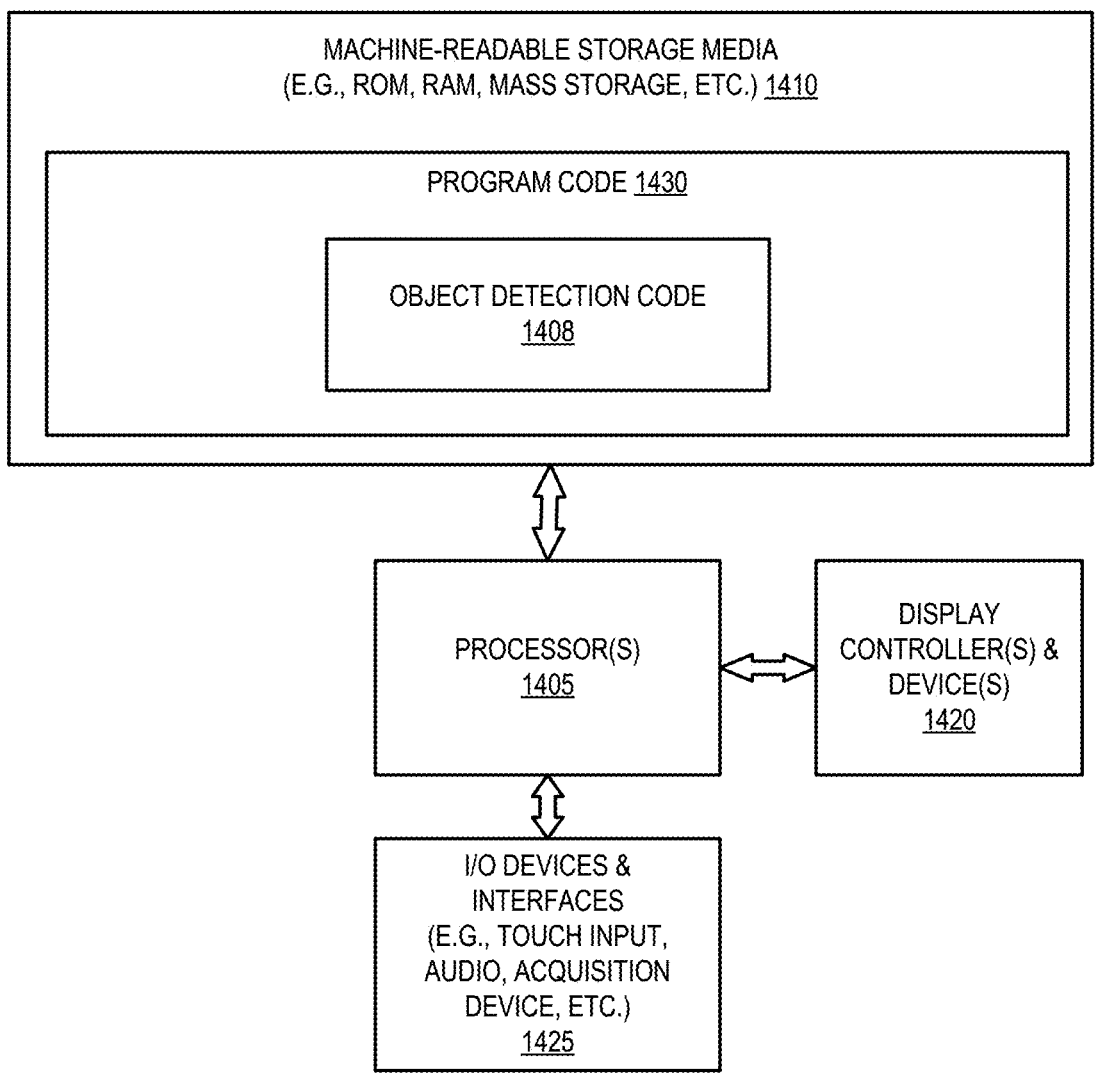
FIG. 21 is a block diagram illustrating an exemplary data processing system that may be used in some embodiments.

FIG. 21 illustrates a block diagram for an exemplary data processing system 1400 that may be used in some embodiments. Data processing system 1400 includes one or more processors 1405 and connected system components (e.g., multiple connected chips). Alternatively, the data processing system 1400 is a system on a chip or Field-Programmable gate array. One or more such data processing systems 1400 may be utilized to implement the functionality of the object detection unit 108 as illustrated in FIGS. 1-20.

The data processing system 1400 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 1410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 1405. For example, the depicted machine readable storage media 1410 may store program code 1430 that, when executed by the processor(s) 1405, causes the data processing system 1400 to perform efficient and accurate detection of an object in an image. For example, the program code 1430 may include object detection code 1408, which when executed by the processor(s) 1405, causes the data processing system 1400 to perform the operations described with reference to FIGS. 1-20.

Thus, an electronic device (e.g., a computer or an FPGA) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 1400 may also include a display controller and display device 1420 to provide a visual user interface for the user, e.g., GUI elements or windows. The visual user interface may be used to enable a user to input parameters to the object detection unit 108, to view results of the object detection, or any other task.

The data processing system 1400 also includes one or more input or output ("I/O") devices and interfaces 1425, which are provided to allow a user to provide input to, receive output from, and otherwise transfer data to and from the system. These I/O devices 1425 may include a mouse, keypad, keyboard, a touch panel or a multi-touch input panel, camera, frame grabber, optical scanner, an audio input/output subsystem (which may include a microphone and/or a speaker for, for example, playing back music or other audio, receiving voice instructions to be executed by the processor(s) 1405, playing audio notifications, etc.), other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1400.

The I/O devices and interfaces 1425 may also include a connector for a dock or a connector for a USB interface, FireWire, Thunderbolt, Ethernet, etc., to connect the system 1400 with another device, external component, or a network. Exemplary I/O devices and interfaces 1425 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1400 with another device, external component, or a network and receive stored instructions, data, tokens, etc. It will be appreciated that one or more buses may be used to interconnect the various components shown in FIG. 21.

It will be appreciated that additional components, not shown, may also be part of the system 1400, and, in certain embodiments, fewer components than that shown in FIG. 21 may also be used in a data processing system 1400. For example, in some embodiments the data processing system 1400 may include or be coupled with an image acquisition device for acquiring images.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. For example, while the flow diagrams in the figures show a particular order of operations performed by certain embodiments of the invention, it should be understood that such order is exemplary. One having ordinary skill in the art would recognize that variations can be made to the flow diagrams without departing from the broader spirit and scope of the invention as set forth in the following claims (e.g., alternative embodiments may perform the operations in a different order, combine certain operations, overlap certain operations, etc.). The embodiments have been described with quantities (e.g., size, dimension, length, width, elongation, area, perimeter, etc.) that can be equal to a given value, it should be understood that such equalities are not intended to be absolute equalities only and that a quantity can be determined to be equal to a given value if it is within an acceptable range from the given value.

Some portions of the preceding detailed descriptions have been presented in terms of algorithms and symbolic representations of transactions on data bits within a computer and memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

What is claimed is:

1. A method for detecting an object in an image, the method comprising:
   (a) detecting a set of one or more line segments in the image;
   (b) identifying a subset of line segments from the set of line segments based on a projection space orientation, wherein the projection space orientation defines a projection space that has a first axis and a second axis perpendicular to the first axis and the first axis is oriented at the projection space orientation;
   (c) projecting each one of the line segments of the subset of line segments into the projection space to obtain a set of projected line segments, wherein each projected line segment of the set of projected line segments is represented by a respective set of projection parameters;
   (d) determining, in the projection space, based on the sets of projection parameters of the set of projected line segments and a predefined shape criterion that characterizes the object, whether the image includes an instance of the object; and
   (e) responsive to determining that the image includes the instance of the object, outputting the instance of the object.

2. The method of claim 1,
wherein the identifying the subset of line segments includes:
   identifying one or more first line segments, wherein each one of the first line segments has a respective line segment orientation within a tolerance angle of the projection space orientation, and
   identifying one or more second line segments, wherein each one of the second line segments has a respective line segment orientation within a second tolerance angle of the projection space orientation offset by 90 degrees; and
wherein the projecting each one of the line segments includes:
   projecting each one of the first line segments to obtain first projected line segments, and
   projecting each one of the second line segments to obtain second projected line segments.

3. The method of claim 2,
wherein the determining, in the projection space, based on the sets of projection parameters of the set of projected line segments and the predefined shape criterion that characterizes the object, whether the image includes the instance of the object includes:
   selecting a subset of projected line segments from the set of projected line segments, wherein the subset of projected line segments includes:
      at least one of the first projected line segments, and
      at least one of the second projected line segments, and
   determining, based on the sets of projection parameters of the subset of projected line segments, whether the subset of projected line segments satisfies the predefined shape criterion that characterizes the object;
wherein the determining that the image includes the instance of the object includes determining that the subset of projected line segments satisfies the predefined shape criterion; and
wherein the outputting the instance of the object includes outputting the subset of projected line segments as the instance of the object.

4. The method of claim 3,
wherein the projecting each one of the first line segments to obtain first projected line segments includes projecting each one of the first line segments onto the second axis to obtain a respective line position parameter and onto the first axis to obtain a respective segment range parameter, wherein the respective line position parameter and the respective segment range parameter form the respective set of projection parameters representing the respective first projected line segment, and
wherein the projecting each one of the second line segments to obtain second projected line segments includes projecting each one of the second line segments onto the first axis to obtain a respective line position parameter and onto the second axis to obtain a respective segment range parameter, wherein the respective line position parameter and the respective segment range parameter form the respective set of projection parameters representing the respective second projected line segment.

5. The method of claim 2,
wherein the determining, in the projection space, based on the sets of projection parameters of the set of projected line segments and the predefined shape criterion that characterizes the object, whether the image includes the instance of the object includes:
   identifying a set of macro projected line segments from the set of projected line segments, each macro projected line segment composed of a group of one or more collinear projected line segments from the set of projected line segments and each macro projected line segment being associated with a macro set of projection parameters determined from the sets of projection parameters of the group of projected line segments composing the respective macro projected line segment, wherein the set of macro projected line segments includes:
      one or more first macro projected line segments, each composed of a group of one or more of the first projected line segments, and
      one or more second macro projected line segments, each composed of a group of one or more of the second projected line segments,
   selecting a subset of macro projected line segments from the set of macro projected line segments, wherein the subset of macro projected line segments includes:

at least one of the first macro projected line segments, and
at least one of the second macro projected line segments, and
determining, based on the macro sets of projection parameters of the subset of macro projected line segments, whether the subset of macro projected line segments satisfies the predefined shape criterion that characterizes the object;

wherein the determining that the image includes the instance of the object includes determining that the subset of macro projected line segments satisfies the predefined shape criterion; and wherein the outputting the instance of the object includes outputting the subset of macro projected line segments as the instance of the object.

6. The method of claim 5,
wherein the set of projection parameters of each projected line segment of the set of projected line segments includes a line position parameter and a segment range parameter, and
wherein the macro set of projection parameters associated with each macro projected line segment from the set of macro projected line segments includes a macro line position parameter and a macro segment range parameter, wherein the macro line position parameter is determined from the line position parameters of the group of projected line segments composing the respective macro projected line segment and the macro segment range parameter is determined from the segment range parameters of the group of projected line segments composing the respective macro projected line segment.

7. The method of claim 2, wherein the object is a rectangle.

8. The method of claim 2, wherein the projection space orientation is one of a plurality of projection space orientations, each projection space orientation of the plurality of projection space orientations defining a respective projection space oriented at the respective projection space orientation, and wherein the method further comprises performing operations (b), (c), (d) and (e) for each projection space orientation of the plurality of projection space orientations.

9. A non-transitory computer-readable storage medium that provides instructions, which when executed by a processor cause said processor to perform operations for detecting an object in an image, the operations comprising:
(a) detecting a set of one or more line segments in the image;
(b) identifying a subset of line segments from the set of line segments based on a projection space orientation, wherein the projection space orientation defines a projection space that has a first axis and a second axis perpendicular to the first axis and the first axis is oriented at the projection space orientation;
(c) projecting each one of the line segments of the subset of line segments into the projection space to obtain a set of projected line segments, wherein each projected line segment of the set of projected line segments is represented by a respective set of projection parameters;
(d) determining, in the projection space, based on the sets of projection parameters of the set of projected line segments and a predefined shape criterion that characterizes the object, whether the image includes an instance of the object; and (e) responsive to determining that the image includes the instance of the object, outputting the instance of the object.

10. An image processing system for detecting an object in an image comprising:
one or more processors; and
a non-transitory computer readable storage medium to store code, which when executed by the one or more processors causes the image processing system to perform operations including:
(a) detecting a set of one or more line segments in the image;
(b) identifying a subset of line segments from the set of line segments based on a projection space orientation, wherein the projection space orientation defines a projection space that has a first axis and a second axis perpendicular to the first axis and the first axis is oriented at the projection space orientation;
(c) projecting each one of the line segments of the subset of line segments into the projection space to obtain a set of projected line segments, wherein each projected line segment of the set of projected line segments is represented by a respective set of projection parameters;
(d) determining, in the projection space, based on the sets of projection parameters of the set of projected line segments and a predefined shape criterion that characterizes the object, whether the image includes an instance of the object; and
(e) responsive to determining that the image includes the instance of the object, outputting the instance of the object.

11. The non-transitory computer-readable storage medium of claim 9,
wherein the identifying the subset of line segments includes:
identifying one or more first line segments, wherein each one of the first line segments has a respective line segment orientation within a tolerance angle of the projection space orientation, and
identifying one or more second line segments, wherein each one of the second line segments has a respective line segment orientation within a second tolerance angle of the projection space orientation offset by 90 degrees; and
wherein the projecting each one of the line segments includes:
projecting each one of the first line segments to obtain first projected line segments, and
projecting each one of the second line segments to obtain second projected line segments.

12. The non-transitory computer-readable storage medium of claim 11,
wherein the determining, in the projection space, based on the sets of projection parameters of the set of projected line segments and the predefined shape criterion that characterizes the object, whether the image includes the instance of the object includes:
selecting a subset of projected line segments from the set of projected line segments, wherein the subset of projected line segments includes:
at least one of the first projected line segments, and
at least one of the second projected line segments, and
determining, based on the sets of projection parameters of the subset of projected line segments, whether the subset of projected line segments satisfies the predefined shape criterion that characterizes the object;
wherein the determining that the image includes the instance of the object includes determining that the subset of projected line segments satisfies the predefined shape criterion; and
wherein the outputting the instance of the object includes outputting the subset of projected line segments as the instance of the object.

13. The non-transitory computer-readable storage medium of claim 12,
wherein the projecting each one of the first line segments to obtain first projected line segments includes projecting each one of the first line segments onto the second axis to obtain a respective line position parameter and onto the first axis to obtain a respective segment range parameter, wherein the respective line position parameter and the respective segment range parameter form the respective set of projection parameters representing the respective first projected line segment, and
wherein the projecting each one of the second line segments to obtain second projected line segments includes projecting each one of the second line segments onto the first axis to obtain a respective line position parameter and onto the second axis to obtain a respective segment range parameter, wherein the respective line position parameter and the respective segment range parameter form the respective set of projection parameters representing the respective second projected line segment.

14. The non-transitory computer-readable storage medium of claim 11,
wherein the determining, in the projection space, based on the sets of projection parameters of the set of projected line segments and the predefined shape criterion that characterizes the object, whether the image includes the instance of the object includes:
identifying a set of macro projected line segments from the set of projected line segments, each macro projected line segment composed of a group of one or more collinear projected line segments from the set of projected line segments and each macro projected line segment being associated with a macro set of projection parameters determined from the sets of projection parameters of the group of projected line segments composing the respective macro projected line segment, wherein the set of macro projected line segments includes:
one or more first macro projected line segments, each composed of a group of one or more of the first projected line segments, and
one or more second macro projected line segments, each composed of a group of one or more of the second projected line segments,
selecting a subset of macro projected line segments from the set of macro projected line segments, wherein the subset of macro projected line segments includes:
at least one of the first macro projected line segments, and
at least one of the second macro projected line segments, and
determining, based on the macro sets of projection parameters of the subset of macro projected line segments, whether the subset of macro projected line segments satisfies the predefined shape criterion that characterizes the object;
wherein the determining that the image includes the instance of the object includes determining that the subset of macro projected line segments satisfies the predefined shape criterion; and
wherein the outputting the instance of the object includes outputting the subset of macro projected line segments as the instance of the object.

15. The non-transitory computer-readable storage medium of claim 14,
wherein the set of projection parameters of each projected line segment of the set of projected line segments includes a line position parameter and a segment range parameter, and
wherein the macro set of projection parameters associated with each macro projected line segment from the set of macro projected line segments includes a macro line position parameter and a macro segment range parameter, wherein the macro line position parameter is determined from the line position parameters of the group of projected line segments composing the respective macro projected line segment and the macro segment range parameter is determined from the segment range parameters of the group of projected line segments composing the respective macro projected line segment.

16. The non-transitory computer-readable storage medium of claim 12, wherein the object is a rectangle.

17. The non-transitory computer-readable storage medium of claim 14, wherein the object is a rectangle.

18. The non-transitory computer-readable storage medium of claim 11, wherein the projection space orientation is one of a plurality of projection space orientations, each projection space orientation of the plurality of projection space orientations defining a respective projection space oriented at the respective projection space orientation, and wherein the operations further comprise performing operations (b), (c), (d) and (e) for each projection space orientation of the plurality of projection space orientations.

19. The image processing system of claim 10,
wherein the identifying the subset of line segments includes:
identifying one or more first line segments, wherein each one of the first line segments has a respective line segment orientation within a tolerance angle of the projection space orientation, and
identifying one or more second line segments, wherein each one of the second line segments has a respective line segment orientation within a second tolerance angle of the projection space orientation offset by 90 degrees; and
wherein the projecting each one of the line segments includes:
projecting each one of the first line segments to obtain first projected line segments, and
projecting each one of the second line segments to obtain second projected line segments.

20. The image processing system of claim 19,
wherein the determining, in the projection space, based on the sets of projection parameters of the set of projected line segments and the predefined shape criterion that characterizes the object, whether the image includes the instance of the object includes:
selecting a subset of projected line segments from the set of projected line segments, wherein the subset of projected line segments includes:
at least one of the first projected line segments, and
at least one of the second projected line segments, and determining, based on the sets of projection parameters of the subset of projected line segments, whether the subset of projected line segments satisfies the predefined shape criterion that characterizes the object;

wherein the determining that the image includes the instance of the object includes determining that the subset of projected line segments satisfies the predefined shape criterion; and wherein the outputting the instance of the object includes outputting the subset of projected line segments as the instance of the object.

21. The image processing system of claim 20, wherein the projecting each one of the first line segments to obtain first projected line segments includes projecting each one of the first line segments onto the second axis to obtain a respective line position parameter and onto the first axis to obtain a respective segment range parameter, wherein the respective line position parameter and the respective segment range parameter form the respective set of projection parameters representing the respective first projected line segment, and wherein the projecting each one of the second line segments to obtain second projected line segments includes projecting each one of the second line segments onto the first axis to obtain a respective line position parameter and onto the second axis to obtain a respective segment range parameter, wherein the respective line position parameter and the respective segment range parameter form the respective set of projection parameters representing the respective second projected line segment.

22. The image processing system of claim 19, wherein the determining, in the projection space, based on the sets of projection parameters of the set of projected line segments and the predefined shape criterion that characterizes the object, whether the image includes the instance of the object includes:

identifying a set of macro projected line segments from the set of projected line segments, each macro projected line segment composed of a group of one or more collinear projected line segments from the set of projected line segments and each macro projected line segment being associated with a macro set of projection parameters determined from the sets of projection parameters of the group of projected line segments composing the respective macro projected line segment, wherein the set of macro projected line segments includes:

one or more first macro projected line segments, each composed of a group of one or more of the first projected line segments, and one or more second macro projected line segments, each composed of a group of one or more of the second projected line segments, selecting a subset of macro projected line segments from the set of macro projected line segments, wherein the subset of macro projected line segments includes:

at least one of the first macro projected line segments, and at least one of the second macro projected line segments, and determining, based on the macro sets of projection parameters of the subset of macro projected line segments, whether the subset of macro projected line segments satisfies the predefined shape criterion that characterizes the object;

wherein the determining that the image includes the instance of the object includes determining that the subset of macro projected line segments satisfies the predefined shape criterion; and wherein the outputting the instance of the object includes outputting the subset of macro projected line segments as the instance of the object.

23. The image processing system of claim 22, wherein the set of projection parameters of each projected line segment of the set of projected line segments includes a line position parameter and a segment range parameter, and wherein the macro set of projection parameters associated with each macro projected line segment from the set of macro projected line segments includes a macro line position parameter and a macro segment range parameter, wherein the macro line position parameter is determined from the line position parameters of the group of projected line segments composing the respective macro projected line segment and the macro segment range parameter is determined from the segment range parameters of the group of projected line segments composing the respective macro projected line segment.

24. The image processing system of claim 19, wherein the object is a rectangle.

25. The image processing system of claim 19, wherein the projection space orientation is one of a plurality of projection space orientations, each projection space orientation of the plurality of projection space orientations defining a respective projection space oriented at the respective projection space orientation, and wherein the operations further include performing operations (b), (c), (d) and (e) for each projection space orientation of the plurality of projection space orientations.

* * * * *